(12) United States Patent
Ota et al.

(10) Patent No.: US 7,542,236 B2
(45) Date of Patent: Jun. 2, 2009

(54) HEAD SLIDER, HEAD GIMBAL ASSEMBLY, AND HARD DISK DIRVE

(75) Inventors: Norikazu Ota, Tokyo (JP); Tetsuro Sasaki, Tokyo (JP); Nobuya Oyama, Tokyo (JP); Soji Koide, Tokyo (JP)

(73) Assignee: TDK Corporation, Tokyo (JP)

( * ) Notice: Subject to any disclaimer, the term of this patent is extended or adjusted under 35 U.S.C. 154(b) by 381 days.

(21) Appl. No.: 10/799,608

(22) Filed: Mar. 15, 2004

(65) Prior Publication Data

US 2004/0184192 A1    Sep. 23, 2004

(30) Foreign Application Priority Data

Mar. 20, 2003  (JP) .............................. 2003-078585

(51) Int. Cl.
G11B 5/127 (2006.01)
G11B 5/60 (2006.01)
G11B 15/64 (2006.01)

(52) U.S. Cl. ................................ 360/234.5; 360/125.74
(58) Field of Classification Search ................ 360/128, 360/234.5, 234.4, 125.3, 125.31, 125.32, 360/125.71, 125.74, 125.75
See application file for complete search history.

(56) References Cited

U.S. PATENT DOCUMENTS

| | | | | |
|---|---|---|---|---|
| 4,761,699 A | * | 8/1988 | Ainslie et al. ............ | 360/234.5 |
| 6,459,551 B1 | * | 10/2002 | Hayakawa .................. | 360/313 |
| 6,757,135 B2 | * | 6/2004 | Rancour et al. .......... | 360/234.6 |
| 6,985,332 B1 | * | 1/2006 | Sluzewski et al. ........ | 360/234.5 |
| 2003/0026046 A1 | * | 2/2003 | Yamakura et al. ........... | 360/316 |
| 2003/0099054 A1 | * | 5/2003 | Kamijima .................... | 360/59 |
| 2003/0123190 A1 | * | 7/2003 | Sato et al. ................ | 360/234.5 |
| 2004/0070880 A1 | * | 4/2004 | Fu et al. ................... | 360/234.5 |

FOREIGN PATENT DOCUMENTS

| | | |
|---|---|---|
| JP | A 05-020635 | 1/1993 |
| JP | A 10-124824 | 5/1998 |
| JP | A 2000-285422 | 10/2000 |

* cited by examiner

Primary Examiner—Brian E Miller
Assistant Examiner—Adam B Dravininkas
(74) Attorney, Agent, or Firm—Oliff & Berridge, PLC

(57) ABSTRACT

A magnetic head part is constituted by a reproducing head part having a GMR device and a recording head part acting as an inductive electromagnetic transducer which are laminated on a support. The magnetic head part further comprises a heater. One of poles of the heater is electrically connected to a heater electrode pad disposed on a first surface of a head slider. The other pole is electrically connected to a substrate constituting the support, and is energized by way of a second surface of the head slider.

6 Claims, 22 Drawing Sheets

HEAD SLIDER, HEAD GIMBAL ASSEMBLY, AND HARD DISK DIRVE

BACKGROUND OF THE INVENTION

1. Field of the Invention

The present invention relates to a head slider, head gimbal assembly, and hard disk drive including a thin-film magnetic head.

2. Related Background Art

A head slider formed with a thin-film magnetic head came into use in a hard disk drive in 1979. The head slider at that time has been referred to as mini slider in general. Currently, head sliders known as pico sliders have become mainstream. Such a head slider comprises a plurality of electrode pads, arranged in a single surface, for energizing a device in a thin-film magnetic head (see, for example, Japanese Patent Application Laid-Open No. 2000-285422).

From now on, as hard disk drives are made smaller at lower cost, head sliders are expected to become smaller and shift to those known as femto slider whose size is about 20% that of the mini slider.

SUMMARY OF THE INVENTION

As the head sliders are made smaller, electrode pads are required to reduce their size if the same number of electrode pads are to be provided in a single surface. When the size of electrode pads is reduced, however, the strength of ball bonding for connecting with wiring may decrease.

It is an object of the present invention to provide a head slider, a head gimbal assembly, and a hard disk drive which have a wiring structure adaptable to smaller sizes.

The present invention provides a head slider comprising a support; and a magnetic head part, formed on the support, for carrying out at least one of recording and reproducing of information; the magnetic head part comprising a device to be energized including first and second poles for supplying a current therebetween, and an energizing electrode pad disposed on a first surface of the magnetic head part on a side opposite from the support; the first pole of the device to be energized being electrically connected to the energizing electrode pad; the second pole of the device to be energized being conductible by way of a second surface different from the first surface.

In such a head slider, one of poles (first pole) of the device to be energized provided with the magnetic head part is connected to the energizing electrode pad disposed on the first surface. The other pole (second pole) is conductible by way of a surface (second surface) different from the first surface. Namely, when a current is caused to flow between the electrode pad and the second surface, the device to be energized can be energized. This can reduce the number of electrode pads provided in a single surface of the head slider, thus making it possible to realize a wiring structure for energizing the device to be energized, in the magnetic head part without considerably reducing the size of electrode pads even when the head slider is made smaller.

In this case, the support may have the second surface. The support is constituted by AlTiC ($Al_2O_3.TiC$), for example.

The head slider in accordance with the present invention may be configured such that the magnetic head part comprises a magnetoresistive device for reproducing, an inductive electromagnetic transducer for recording, and a heater element for generating heat upon energization; the device to be energized is one of devices of the magnetoresistive device, inductive electromagnetic transducer, and heater element; and the devices other than the device to be energized are connected to respective pairs of electrode pads disposed on the first surface.

In this case, poles of any two devices are connected to respective pairs of electrode pads. Of the remaining device, one pole is connected to an electrode pad, whereas the other is energized by way of a surface different from the surface provided with the electrode pads. Namely, the number of electrode pads, which should conventionally be 6 on a single surface of the head slider, can be reduced to 5. Therefore, even when the head slider is made smaller, all the devices can be energized without reducing the size of each electrode pad.

The present invention provides a head gimbal assembly comprising a head slider and an arm member mounted with the head slider; the head slider comprising a support and a magnetic head part, formed on the support, for carrying out at least one of recording and reproducing of information; the magnetic head part comprising a device to be energized including first and second poles for supplying a current therebetween, and an energizing electrode pad disposed on a first surface of the magnetic head part on a side opposite from the support; the first pole of the device to be energized, being electrically connected to the energizing electrode pad; the second pole of the device to be energized, being conductible by way of a second surface different from the first surface.

The present invention provides a hard disk drive comprising a head gimbal assembly including an arm member mounted with a head slider, and a recording medium; the head slider comprising a support and a magnetic head part, formed on the support, for carrying out at least one of recording and reproducing of information; the magnetic head part comprising a device to be energized, including first and second poles for supplying a current therebetween, and an energizing electrode pad disposed on a first surface of the magnetic head part on a side opposite from the support; the first pole of the device to be energized, being electrically connected to the energizing electrode pad; the second pole of the device to be energized, being conductible by way of a second surface different from the first surface.

In thus configured head gimbal assembly and hard disk drive, one of poles (first pole) of the device to be energized, provided with the magnetic head part is connected to the energizing electrode pad disposed on the first surface. The other pole (second pole) is conductible by way of a surface (second surface) different from the first surface. Namely, when a current is caused to flow between the electrode pad and the second surface, the device to be energized can be energized. This can reduce the number of electrode pads provided in a single surface of the head slider, thus making it possible to realize a wiring structure for energizing the device to be energized, in the magnetic head part without considerably reducing the size of electrode pads even when the head slider is made smaller.

In this case, the support may have the second surface. The support is constituted by AlTiC ($Al_2O_3.TiC$), for example.

The second surface may be in contact with the arm member. In this case, the second surface can be energized by causing a current to flow through the arm member. As a consequence, no wiring for energizing is necessary in the second surface.

The head gimbal assembly and hard disk drive in accordance with the present invention may be configured such that the magnetic head part comprises a magnetoresistive device for reproducing, an inductive electromagnetic transducer for recording, and a heater element for generating heat upon energization; the device to be energized is one of devices of the magnetoresistive device, inductive electromagnetic transducer, and heater element; and the devices other than the device to be energized are connected to respective pairs of electrode pads disposed on the first surface.

In this case, poles of any two devices are connected to respective pairs of electrode pads. Of the remaining device, one pole is connected to an electrode pad, whereas the other is energized by way of a surface different from the surface provided with the electrode pads. Namely, the number of electrode pads, which should conventionally be 6 on a single surface of the head slider, can be reduced to 5. Therefore, even when the head slider is made smaller, all the devices can be energized without reducing the size of each electrode pad.

DESCRIPTION OF THE PREFERRED EMBODIMENTS

In the following, preferred embodiments of the present invention will be explained in detail. Constituents identical to each other will be referred to with numerals identical to each other without repeating their overlapping explanations.

Figure 1:
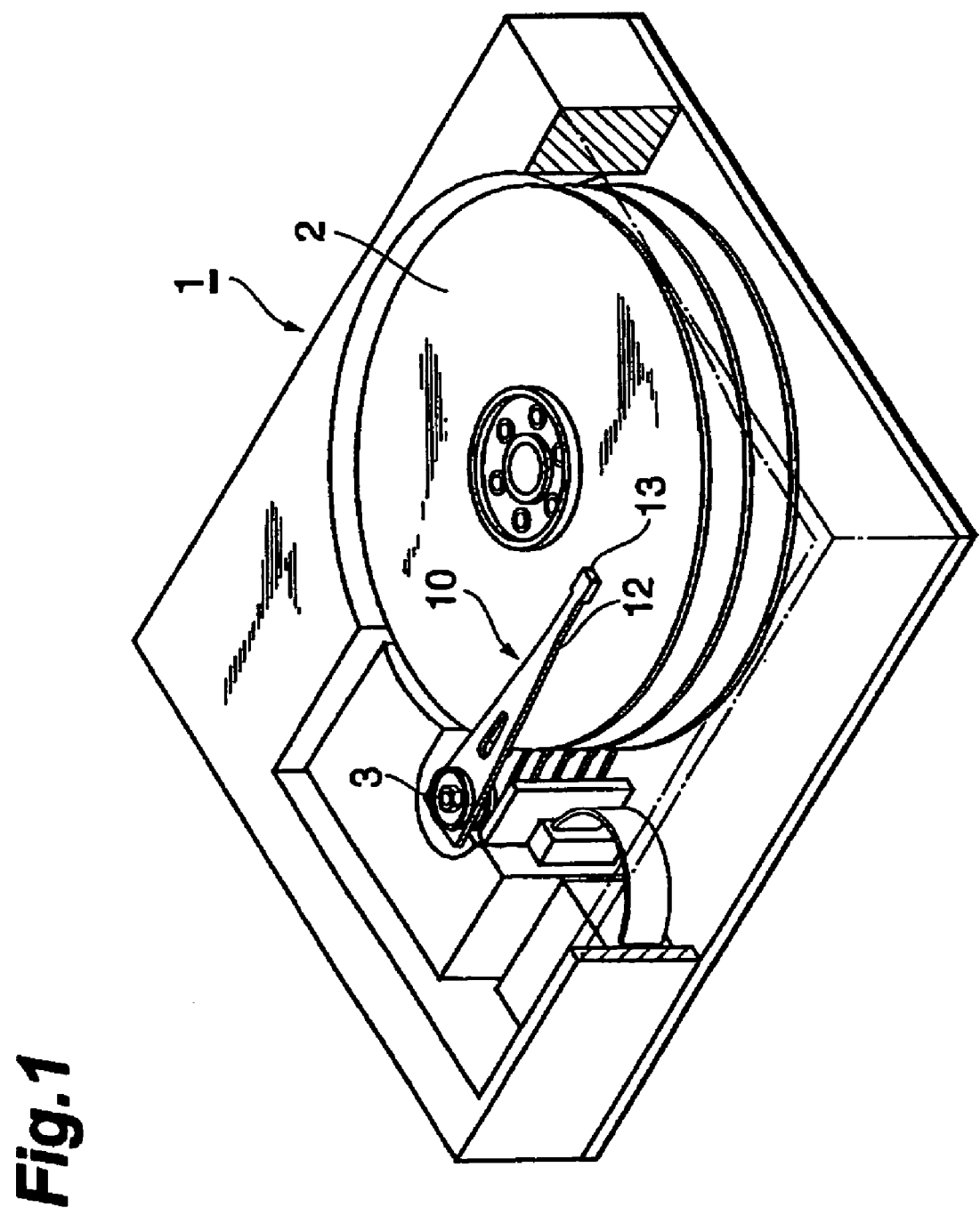
FIG. 1 is a view showing a hard disk drive comprising the head slider in accordance with an embodiment.
Figure 2:
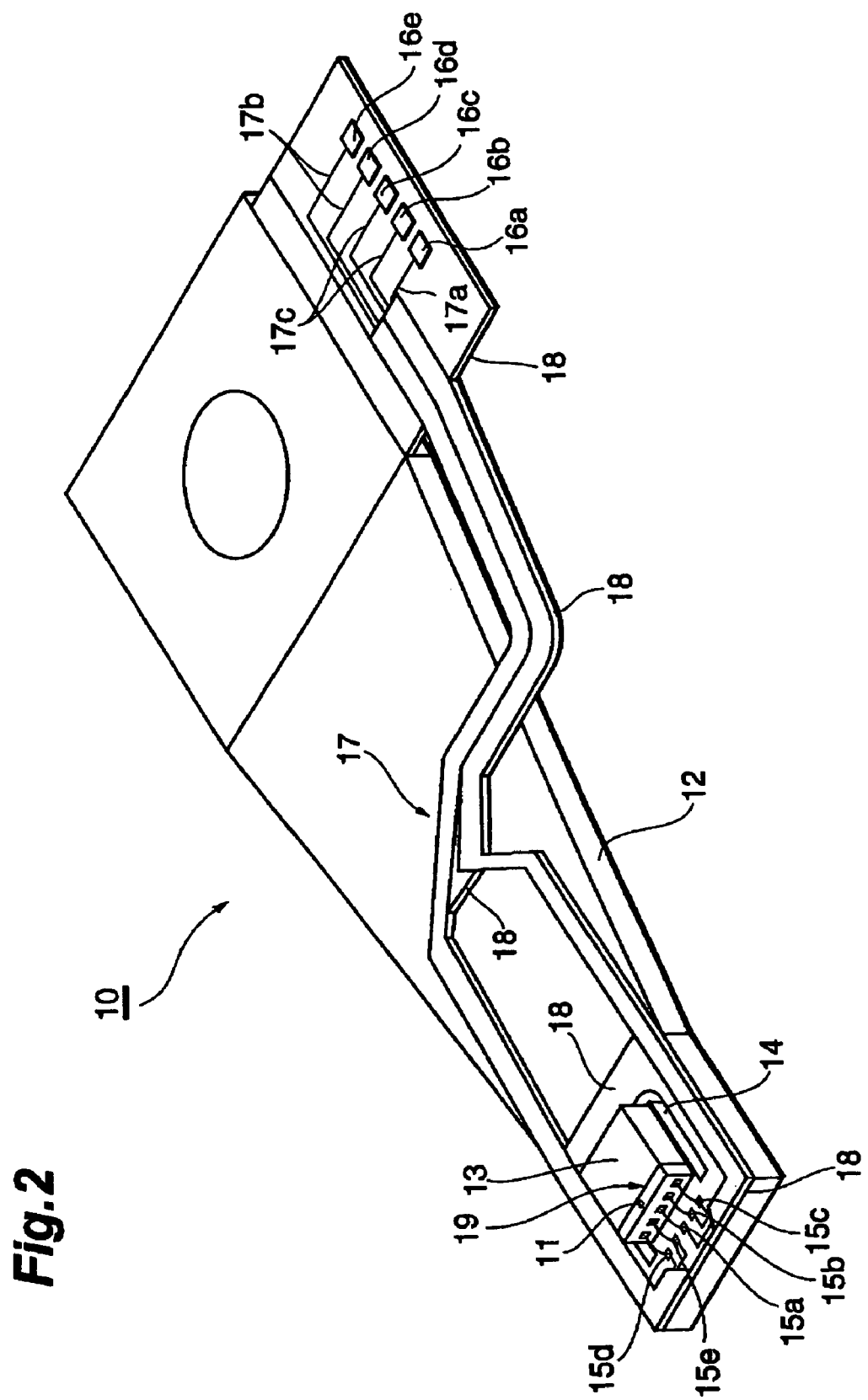
FIG. 2 is a perspective view showing the head gimbal assembly provided with the hard disk drive shown in FIG. 1, which is mounted with a head slider formed with a thin-film magnetic head.
Figure 3:
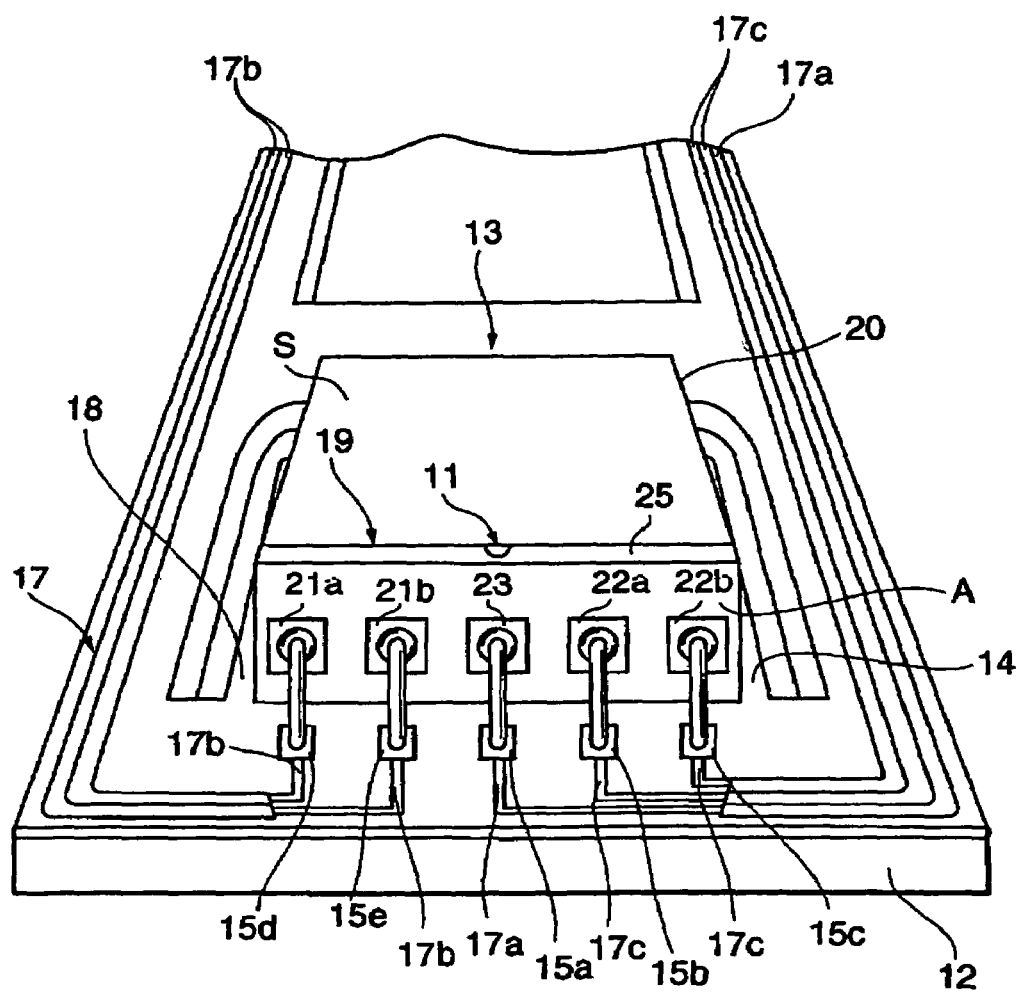
FIG. 3 is an enlarged view of the head slider shown in FIG. 2.

FIG. 1 is a perspective view of a hard disk drive 1 including a head gimbal assembly 10 mounted with a head slider 13 in accordance with an embodiment of the present invention. FIG. 2 is an enlarged perspective view of the head gimbal assembly 10. FIG. 3 is an enlarged view of the head slider 13 shown in FIG. 2.

The hard disk drive 1 actuates the head gimbal assembly 10, so as to cause a thin-film magnetic head 11 to record/reproduce magnetic information onto/from a hard disk (recording medium) 2 rotating at a high speed. The thin-film magnetic head 11 comprises an inductive electromagnetic transducer for recording information onto the hard disk, and a magnetoresistive device (hereinafter also referred to as "MR device") for reproducing information from the hard disk.

The head gimbal assembly 10 can be rotated about a shaft 3 by a voice coil motor, for example. When the head gimbal assembly 10 is rotated, the head slider 13 moves radially of the hard disk 2, i.e., in directions traversing track lines.

As shown in FIGS. 2 and 3, the head gimbal assembly 10 comprises a suspension arm 12 which is a thin plate made of a metal. The leading end side of the suspension arm 12 is formed with a tongue 14 defined by a cutout, whereas the head slider 13 is mounted on the tongue 14.

Referring to FIG. 3, the head slider 13 will be explained in further detail. The head slider 13 comprises a support 20, made of AlTiC ($Al_2O_3$.TiC), having a substantially rectangular parallelepiped form, and the thin-film magnetic head 11 formed thereon. Though the thin-film magnetic head 11 is formed near the horizontal center of the support 20, its position is not restricted thereto. The upper face of the head slider 13 in the drawing is a medium-opposing surface opposing a recording surface of the hard disk 2, and is referred to as an air bearing surface (ABS) S. When the hard disk 2 rotates, the airflow accompanying the rotation levitates the head slider 13, thereby separating the air bearing surface S from the recording surface of the hard disk 2. Though not depicted, the air bearing surface S is formed with a slider rail for adjusting the amount of levitation.

The surface of the head slider 13 on the front side in the drawing is provided with an overcoat layer 25 for protecting the thin-film magnetic head 11. The surface of the overcoat layer 25 acts as a pad forming surface (first surface) A to be formed with electrode pads. This surface A is formed with a single electrode pad 23 for a heater (which will be explained later), a pair of electrode pads 21a, 21b for recording, and a pair of electrode pads 22a, 22b for reproducing.

The heater electrode pad 23 is positioned between the recording electrode pads 21a, 21b and the reproducing electrode pads 22a, 22b. Though the reproducing electrode pads 22a, 22b are disposed on the right side of the recording electrode pads 21a, 21b, their positions may be reversed.

Five terminals 15a to 15e are arranged in parallel on the leading end side of the suspension arm 12. The recording electrode pads 21a, 21b are connected to the terminals 15d, 15e, respectively. The reproducing electrode pads 22a, 22b are connected to the terminals 15b, 15c, respectively. The heater electrode pad 23 is connected to the terminal 15a. For connecting the electrode pads to their corresponding terminals 15a to 15e, ball bonding with gold as a bonding material (gold ball bonding) is utilized, for example.

Disposed on the suspension arm 12 is a printed wiring pattern 17 in which wires 17a to 17c are insulated with coatings. The printed wiring pattern 17 electrically connects the terminals 15a to 15e to terminals 16a to 16e disposed on the base end side of the suspension arm 12 (see FIG. 2). The printed wiring pattern 17 includes one wire 17a and two each of wires 17b, 17c. The wire 17a is connected to the heater electrode pad 23 by way of the terminal 15a. The wires 17b, 17b are connected to the recording electrode pads 21a, 21b by way of the terminals 15d, 15e, respectively. The wires 17c, 17c are connected to the recording electrode pads 22a, 22b by way of the terminals 15b, 15c, respectively.

As shown in FIG. 2, the printed wiring pattern 17 is drawn from the pad forming surface A toward the base end of the suspension arm 12 by way of a side portion of the head slider 13, and extends to the vicinity of the terminals 16a to 16e. The wire 17a is connected to the terminal 16a. The wires 17b, 17b are connected to the terminals 16d, 16e. The wires 17c, 17c are connected to the terminals 16b, 16c. The terminals 16a to 16e are connected to a head amplifier or the like (not depicted) which carries out signal processing for recording and reproducing.

The printed wiring pattern 17 and the terminals 15a to 15e, 16a to 16e are disposed on the suspension arm 12 by way of an insulating layer 18 and thus are electrically insulated from the suspension arm 12 made of a metal. However, a surface where the head slider 13 and the suspension arm 12 are in contact with each other (surface B which will be explained later) is coated with a conductive resin, for example, whereby the slider 13 and the suspension arm 12 are bonded to each other while in a conductible state. The whole surface where the head slider 13 and the suspension arm 12 are in contact with each other may be coated with the conductive resin. Alternatively, for example, only a portion such as an end part may be bonded in a conductible manner with the conductive resin while bonding their major part with an epoxy resin or the like.

The foregoing configuration allows the MR device, electromagnetic transducer, and heater of the thin-film magnetic head 11 to be energized by way of the terminals 15a to 15e.

Figure 4:
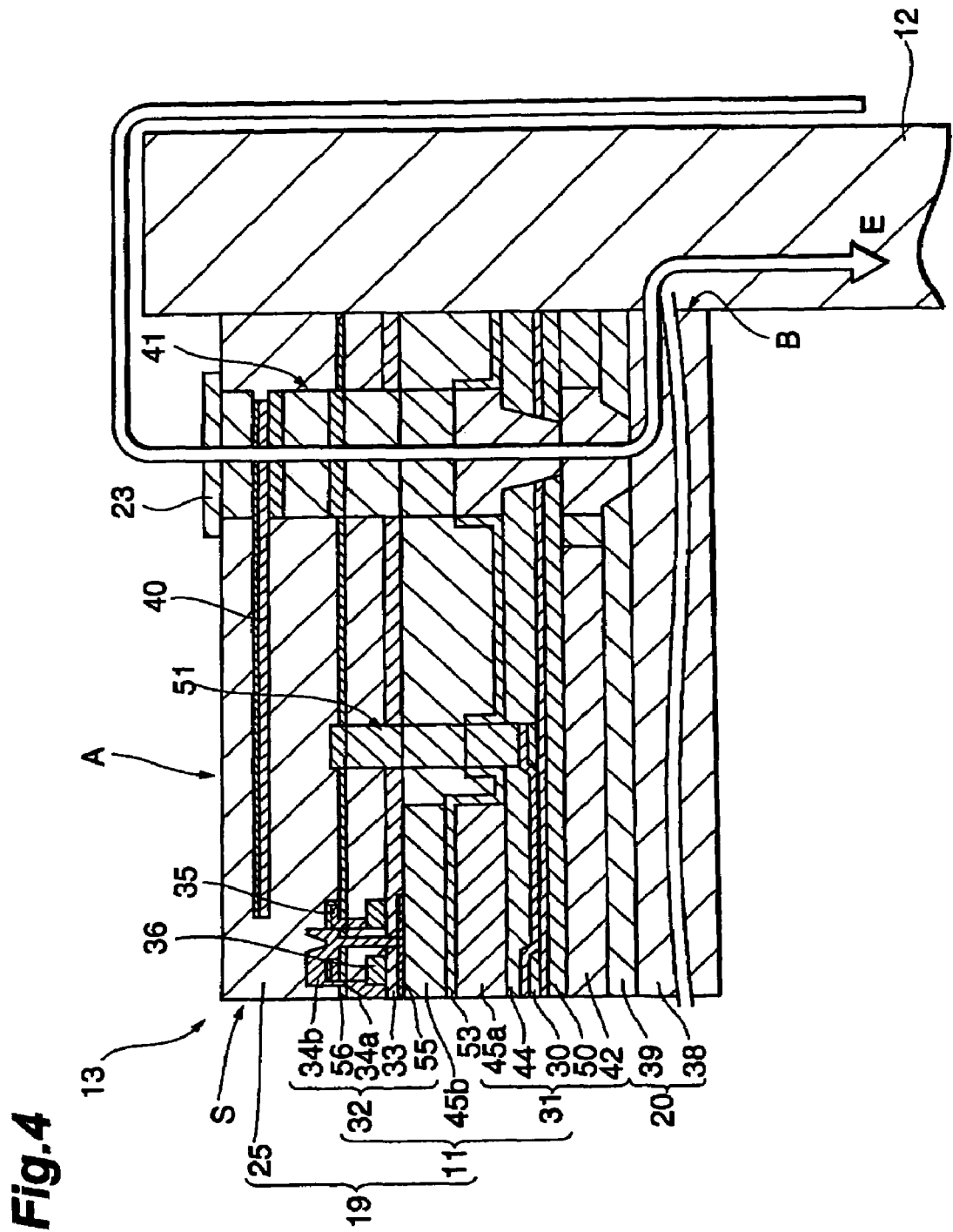
FIG. 4 is a schematic sectional view of the magnetic head part taken in a direction perpendicular to an air bearing surface S.

FIG. 4 is a schematic sectional view of a magnetic head part 19 taken along a direction perpendicular to the air bearing surface S. In this drawing, known structures are illustrated schematically.

The magnetic head part 19 is a combination thin-film magnetic head in which a reproducing head part 31 including a GMR (Giant MagnetoResistive) device 30 for reproducing and a recording head part 32 acting as an inductive electromagnetic transducer for recording are laminated on the support 20. The GMR device is one utilizing a giant magnetoresistive effect yielding a high magnetoresistance change ratio. Instead of the GMR device, AMR (Anisotropic MagnetoResistive) devices utilizing anisotropic magnetoresistive effects, TMR (Tunneling MagnetoResistive) devices utilizing magnetoresistive effects occurring in tunnel junctions, CPP-GMR devices, and the like may be used.

The reproducing head part 31 comprises an upper shield layer 45a and a lower shield layer 42 which are arranged so as to hold the GMR device 30 therebetween. The GMR device 30 has a laminate structure in practice, but is simply illustrated as a single layer in the drawing.

The recording head part 32 comprises two layers of thin-film coils 35, 36 partly surrounded by a magnetic pole part layer 34a and a yoke part layer 34b. The thin-film coils 35, 36 are helical in practice, but are illustrated in a simplified form in the drawing.

An overcoat layer 25 is formed on the recording head part 32 so as to cover the latter. Disposed in the overcoat layer 25 is a heater (a device to be energized) 40 formed from Cu, NiFe, Ta, Ti, CoNiFe alloy, FeAlSi alloy, or the like. Upon energization, the heater 40 generates heat, which thermally expands its surrounding layers, thereby adjusting the distance between the GMR device 30 and the hard disk 2.

A conductive part 41, made of a conductive material such as Cu, extending vertically in the drawing is electrically connected to the heater 40. On the surface of the magnetic head part 19 positioned on the side opposite from the support, i.e., the surface (first surface) A of the overcoat layer 25, the upper end of the conductive part 41 is connected to the heater electrode pad 23 attached onto the surface A. On the other hand, the lower end of the conductive part 41 is connected to a substrate 38.

Similarly, two conductive parts (FIG. 4 showing only a conductive part 51 for the reproducing head part 31) are electrically connected to each of the reproducing head part 31 and recording head part 32, so as to be connected to their corresponding reproducing electrode pads 22a, 22b and recording electrode pads 21a, 21b on the surface (first surface) A.

Since the heater electrode pad 23, recording electrode pads 21a, 21b, and reproducing electrode pads 22a, 22b are arranged in parallel in the direction perpendicular to the sheet surface of FIG. 4, only the heater electrode pad 23 is shown in FIG. 4.

Figure 5:
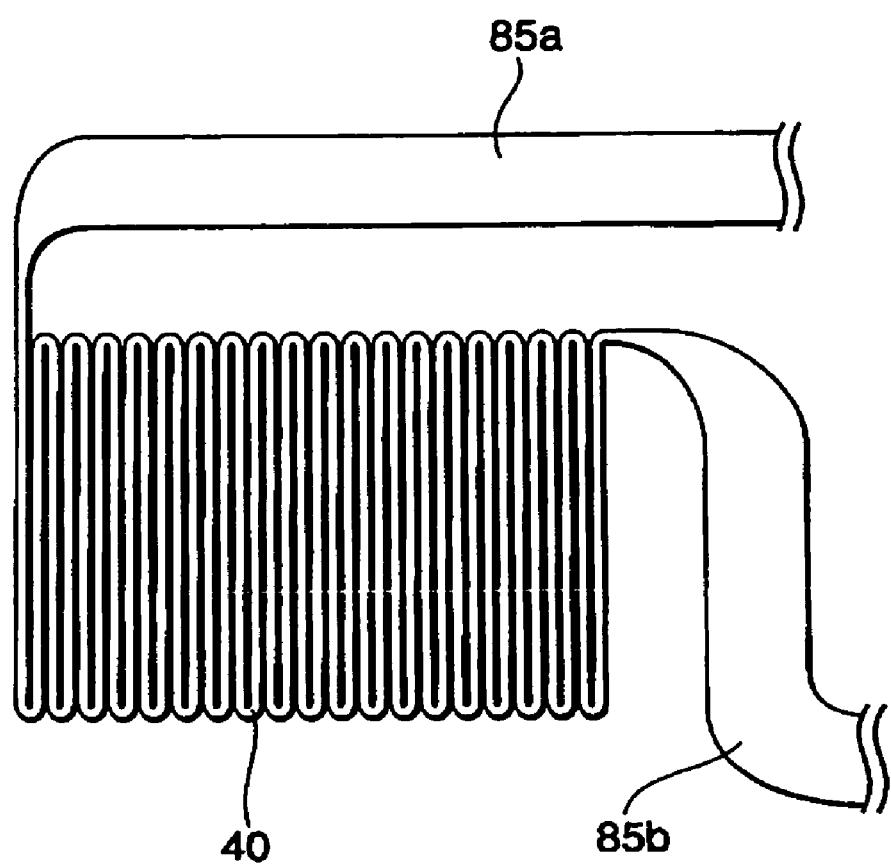
FIG. 5 is a plan view showing an example of heater.

FIG. 5 is a plan view showing an example of the heater 40. The heater 40 has a structure in which a single line is winded. A first electrode (first pole) 85a and a second electrode (second pole) 85b are connected to both ends of the line, respectively. The first electrode 85a is electrically connected to the heater electrode pad 23 by way of the conductive part 41 shown in FIG. 4. The second electrode 85b is electrically connected to the substrate 38 by way of the conductive part 41 shown in FIG. 4.

In thus configured head slider 13, by way of an upper stage of the conductive part 41 (an eighth conductive layer 41i in FIG. 20), the first pole 85a of the heater 40 is electrically connected to the heater electrode pad 23 disposed on the first surface (surface A). The second pole 85b of the heater 40. is electrically connected to the substrate 38 by way of lower stages of the conductive part 41 (first to seventh conductive layers 41a to 41g which will be explained later), and to a surface (second surface) B different from the first surface by way of the substrate 38. In this embodiment, as shown in FIG. 4, the second pole 85b is electrically connected to the side face of the head slider 13 on the side opposite from the air bearing surface S, i.e., the surface B in contact with the suspension arm 12. Therefore, the second pole 85b is conductible by way of the suspension arm 12, whereby the heater 40 can be energized by way of a conductive path indicated by the arrow E shown in FIG. 4.

Figure 6:
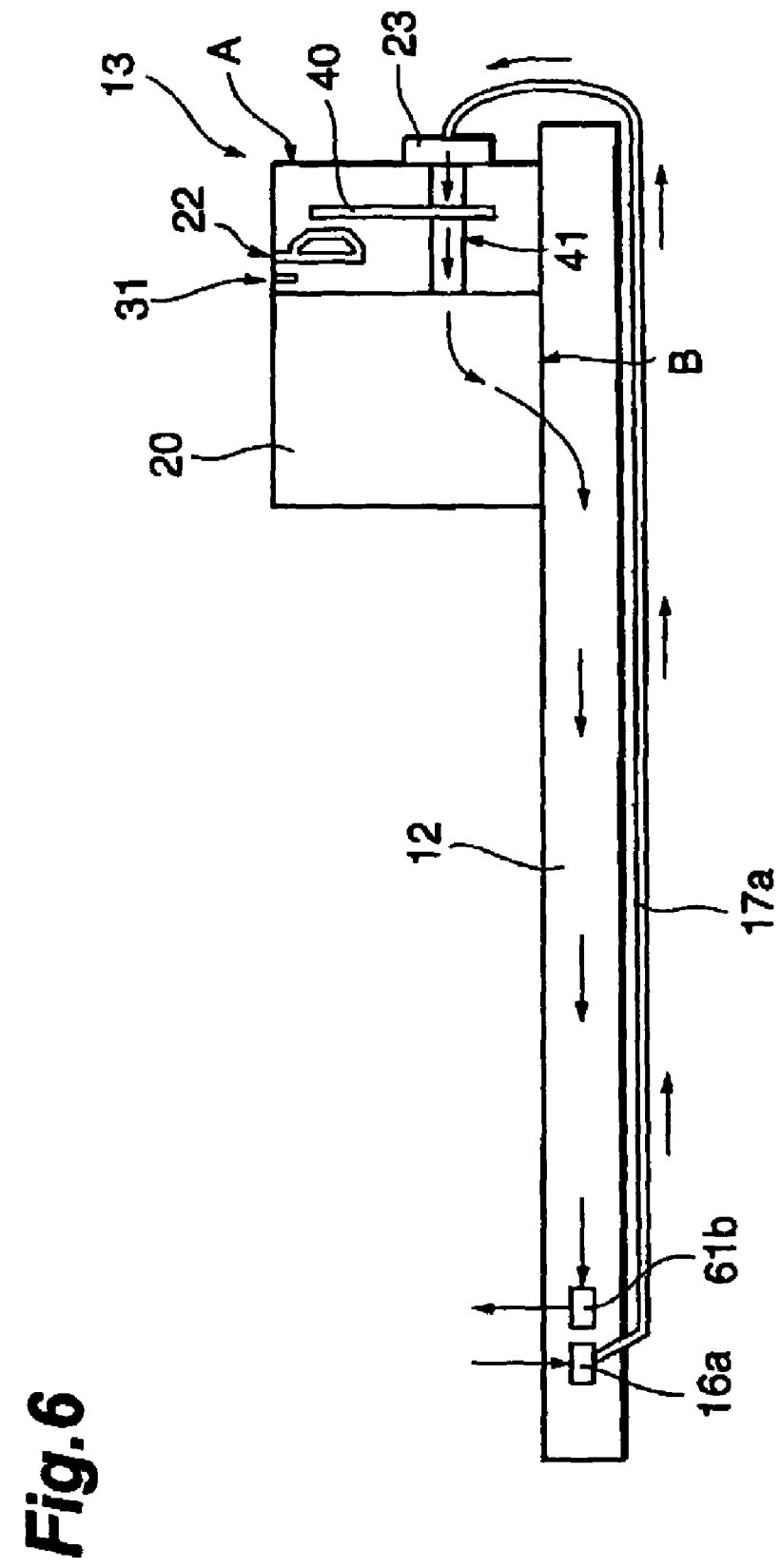
FIG. 6 is a schematic view showing an energized state of the heater shown in FIG. 4.

FIG. 6 is a schematic view showing an energizing state of the heater 40. In this drawing, arrows show schematically a current flow. As shown in FIG. 6, the current supplied from the terminal 16a disposed on the base end side of the suspension arm 12 passes the wire 17a, so as to flow into the heater 40 by way of the heater electrode pad 23. After flowing through the heater 40, the current passes the suspension arm 12 by way of the support 20, and flows out from an external terminal 61b provided on the base end side of the suspension arm 12. When electrical conduction is established by using the suspension arm 12 as such, no wiring for electrical conduction is necessary from the surface B to the external terminal 61b. In FIGS. 4 and 6, the current flow may be reversed. The external terminal 61b may be omitted as well.

Thus, though six electrode pads in total consisting of a pair of electrode pads for each device are conventionally provided in a single surface of the head slider 13, five electrode pads are sufficient for the head slider 13 in accordance with this embodiment as shown in FIG. 3. This can reduce the number of electrode pads provided in the same surface of the head slider 13, thereby making it possible to realize a wiring structure for devices to be energized to be energized in the magnetic head part 19 without considerably reducing the size of electrode pads even when the head slider 13 is made smaller.

With reference to FIGS. 7 to 21, an example of method of making the magnetic head part 19 shown in FIG. 4 will be explained.

Figure 7:
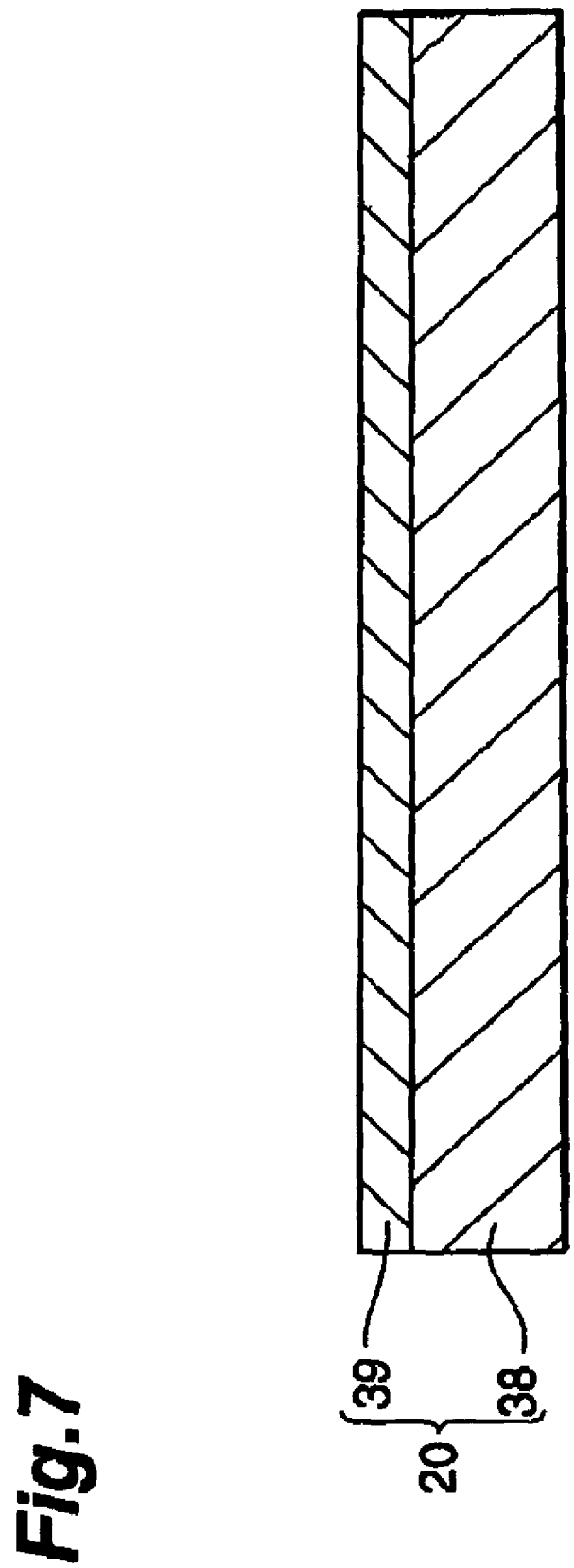
FIG. 7 is a view showing an example of method of making a head slider.

First, as shown in FIG. 7, an undercoat layer 39 made of an insulating material such as alumina ($Al_2O_3$) is formed with a thickness of about 1 μm to about 10 μm by sputtering on a substrate 38 made of AlTiC ($Al_2O_3$.TiC) or the like. The substrate 38 and undercoat layer 39 constitute the support 20 for the head slider 13.

Figure 8:
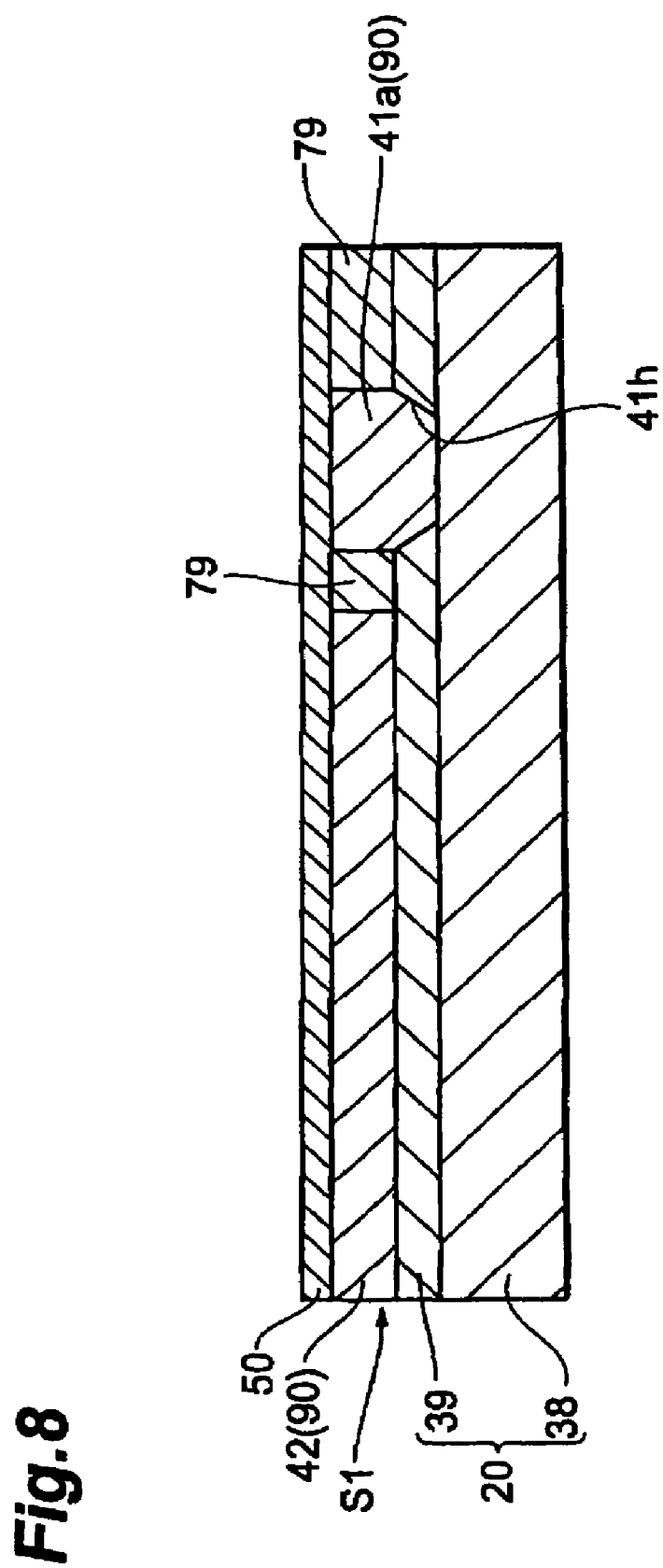
FIG. 8 is a view showing the example of method of making a head slider.

With reference to FIG. 8, a subsequent step will be explained. First, in a rear part of the undercoat layer 39 as seen from a virtual surface S1 (explained as such for the sake of convenience) which will later become the air bearing surface S, a hole 41h for forming a conductive part 41 of the heater 40 is formed by wet etching, for example. Subsequently, a photoresist layer is formed into a predetermined pattern on the undercoat layer 39, and a magnetic layer 90 is formed thereon by plating or the like. This forms a lower shield layer 42 and a first conductive layer 41a constituting the conductive part 41.

Thereafter, an insulating material 79 is laminated thereon by sputtering or the like, so as to bury the part between the lower shield layer 42 and first conductive part 41a, and the surface thereof is flattened. Then, a shield gap layer 50 made of an insulating material such as alumina is formed over the lower shield layer 42, insulating material 79, and first conductive layer 41a by sputtering, for example.

Figure 9:
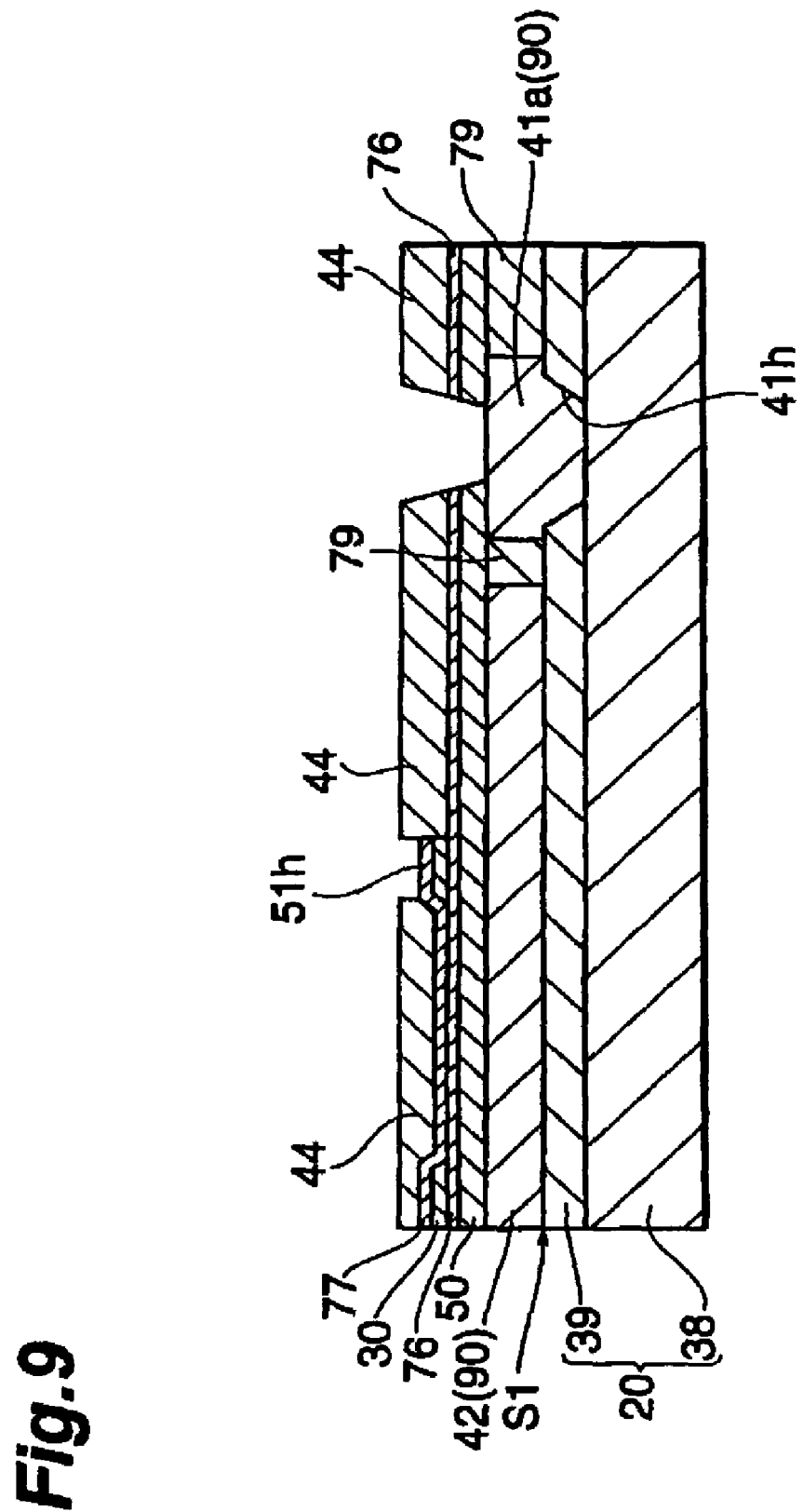
FIG. 9 is a view showing the example of method of making a head slider.

With reference to FIG. 9, a subsequent step will be explained. First, a shield gap layer 76 is formed on the shield gap layer 50, and a GMR device 30 is formed on the layer 76 on the virtual surface S1 side. Then, a conductive lead layer 77 is formed on the GMR device 30.

Next, an insulating layer 44 made of $Al_2O_3$ or the like is formed by sputtering, for example, so as to cover the GMR device 30 and shield gap layer 76. Then, by lithography, milling, and the like, the insulating layer 44 is formed with a hole 51h for forming a conductive part for the reproducing head part 31. A rear end region of the lead layer 77 as seen from the virtual surface S1 is exposed from the hole 51h. Together with the forming of the hole 51h, a through hole is formed on the first conductive layer 41a by using lithography, milling, and the like.

Figure 10:
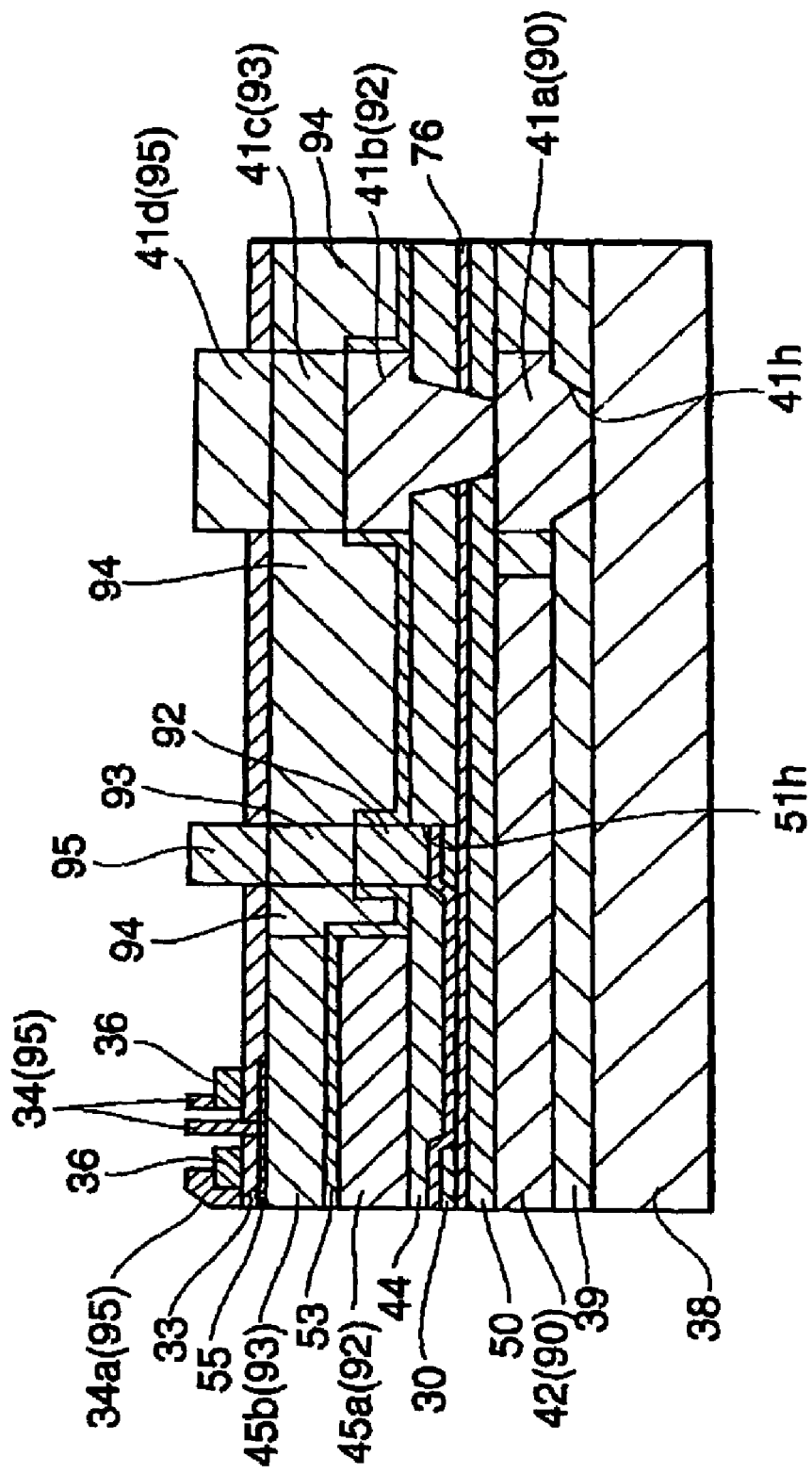
FIG. 10 is a view showing the example of method of making a head slider.

With reference to FIG. 10, a subsequent step will be explained. First, a magnetic layer 92 and a second conductive layer 41b constituting the conductive part 41 are formed by frame plating or the like at the same time. The magnetic layer 92 is formed above the GMR device 30 and on the hole 51h. The part of magnetic layer 92 above the GMR device 30 becomes a first upper shield layer 45a.

Next, a shield gap layer 53 is formed by sputtering or the like. Subsequently, the part of magnetic layer 92 on the hole 51h and the part of shield gap layer 53 on the second conductive layer 41b are removed. Then, a photoresist layer is formed into a predetermined pattern, and a magnetic layer 93 is formed above the GMR device 30, hole 51h, and second conductive layer 41b. The part of magnetic layer 93 above the second conductive layer 41b becomes a third conductive layer 41c constituting a portion of the conductive part 41. The part of magnetic layer 93 above the GMR device 30 becomes a second upper shield layer 45b. Thereafter, an insulating layer 94 is buried in the parts having the magnetic layers 92, 93 removed therefrom, and the whole surface is flattened.

Subsequently, a shield layer 55 made of a magnetic material is further formed on a part of the second shield layer 45b. Then, a recording gap layer 33 made of an alumina film, for example, is formed on the whole surface excluding the areas above the hole 51h and third conductive layer 41c.

Figure 11:
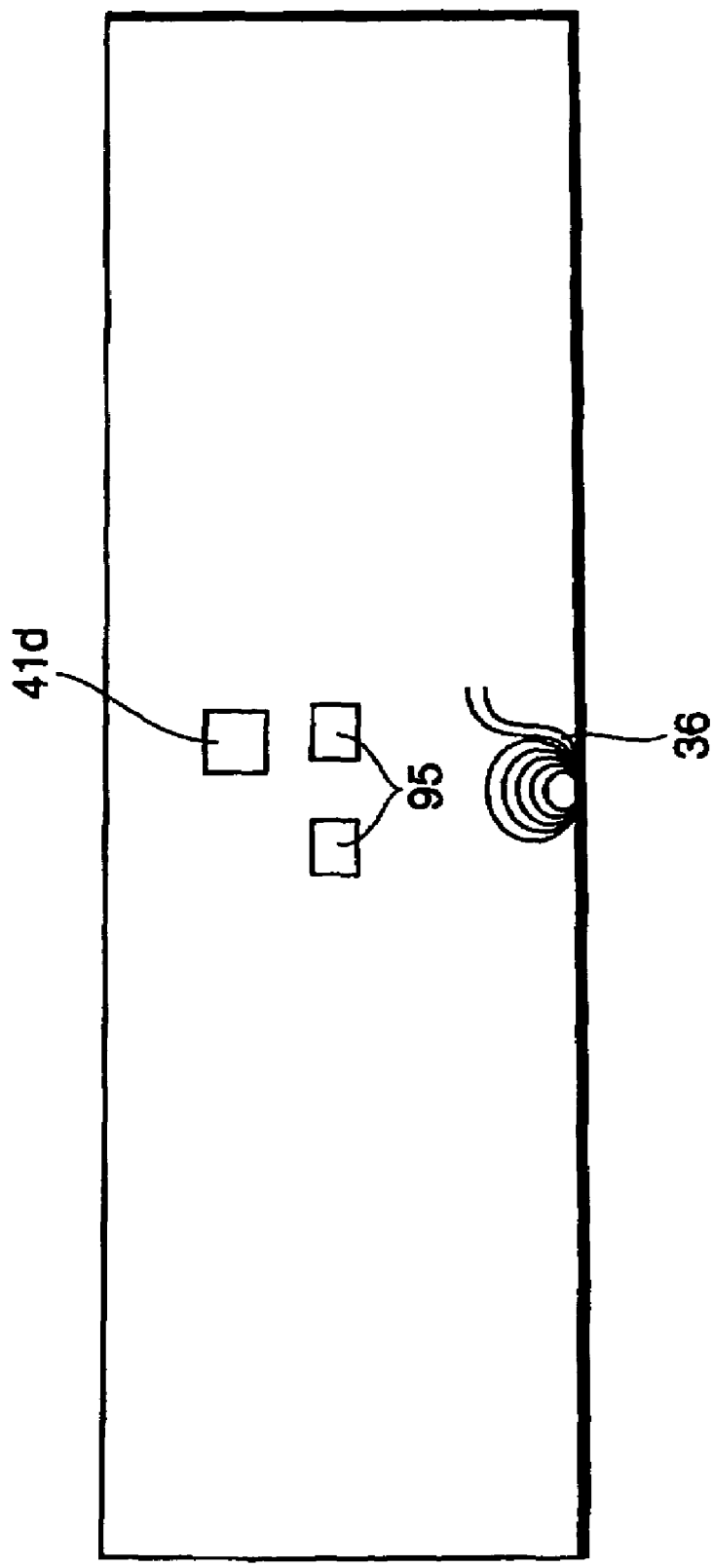
FIG. 11 is a schematic plan view of the head slider shown in FIG. 10.

Also, on the recording gap layer 33 on the shield layer 55, a first layer of thin-film coil 36 is formed with a thickness of about 1 μm to about 3 μm by plating, for example, by way of an insulating film which is not depicted. The thin-film coil 36 is formed by copper (Cu), for example. Though not depicted, a photoresist layer is formed about the thin-film coil 36. FIG. 11 is a schematic plan view at this time (seen from the upper side of FIG. 10).

Subsequently, a magnetic layer 95 is formed on a part of the shield layer 55, on the magnetic layer 93 above the hole 51h, and on the third conductive layer 41c at the same time by using lithography, milling, and the like. This forms a fourth conductive layer 41d constituting the conductive part 41. The part of magnetic layer 93 above the shield layer 55 becomes a magnetic pole part layer 34a.

Figure 12:
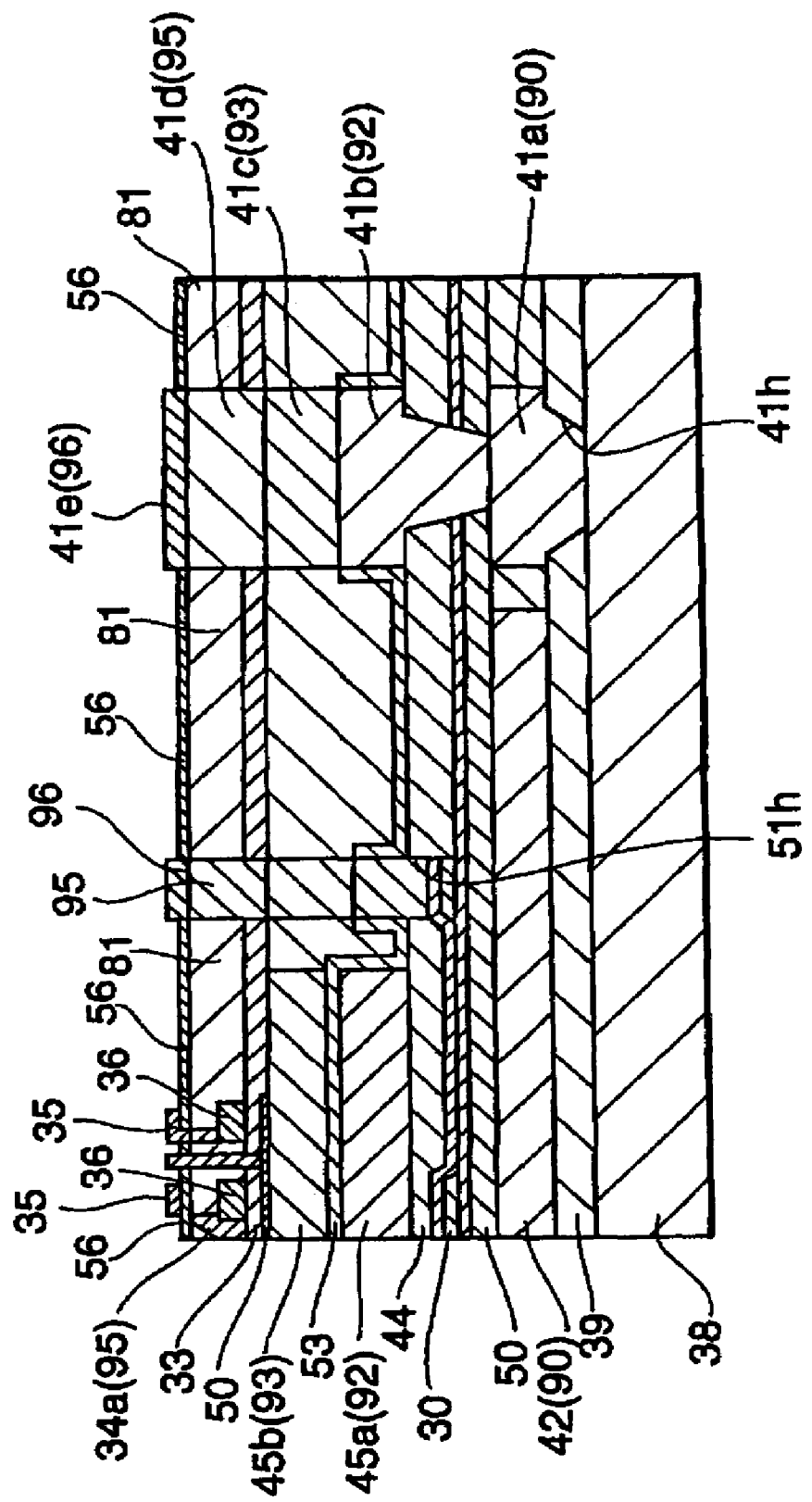
FIG. 12 is a view showing the example of method of making a head slider.

With reference to FIG. 12, a subsequent step will be explained. After an insulating layer 81 is laminated in the state shown in FIG. 10, the whole surface is flattened. Then, a photoresist layer 56 is formed into a predetermined pattern on the insulating layer 81. Subsequently, a second layer of thin-film coil 35 is formed in a part on the photoresist layer 56 and above the thin-film coil 36. Here, on the insulating layer 95 above the hole 51h and on the fourth conductive layer 41d, a layer 96 similar to the thin-film coil 35 is formed by the same material as that of the thin-film coil 35. This forms a fifth conductive layer 41e constituting the conductive part 41. Though two layers of thin-film coil are laminated in this embodiment, a single layer or a multilayer of three or more may be provided. The number of layers and the forming procedure are not limited to those mentioned above.

Figure 13:
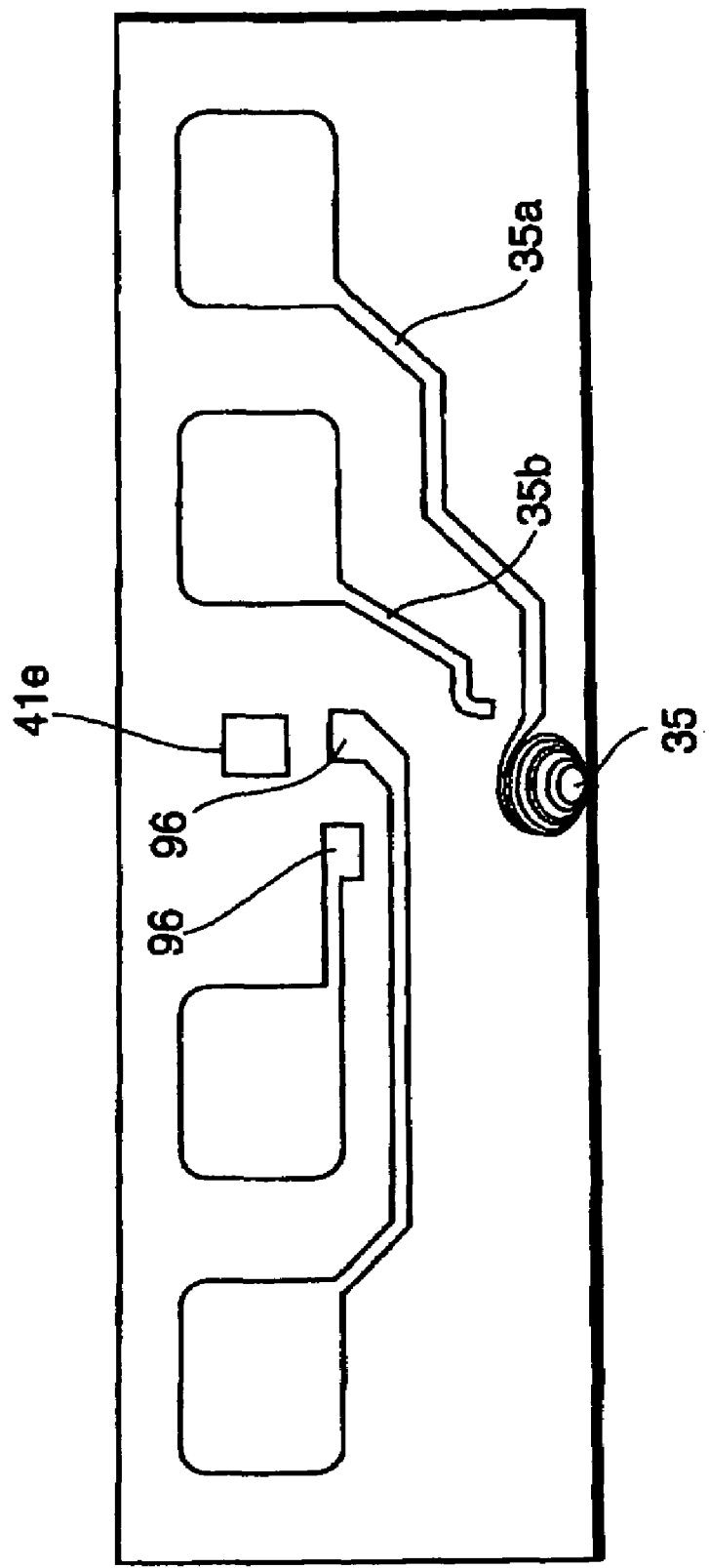
FIG. 13 is a schematic plan view of the head slider shown in FIG. 12.

FIG. 13 is a schematic plan view at this time. Conductive parts 96, 96. are those of the recording head part 32, and are formed together with conductive parts 35a, 35b of the reproducing head part 31 after the recording head part 32 is formed.

Figure 14:
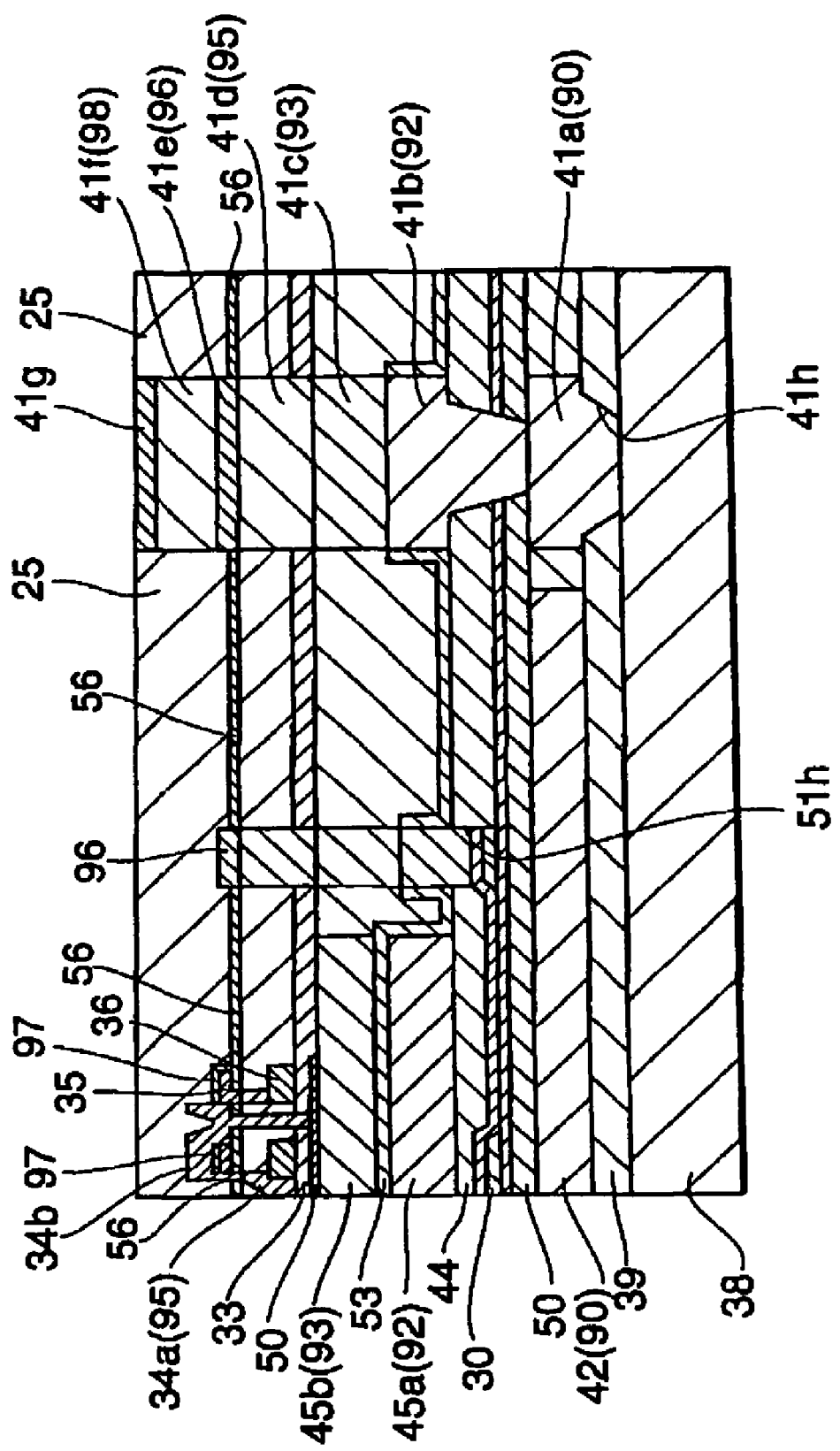
FIG. 14 is a view showing the example of method of making a head slider.

With reference to FIG. 14, a subsequent step will be explained. From the state shown in FIG. 12, an insulating layer 97 is formed on the second layer of thin-film coil 35, and a yoke part layer 34b is formed so as to cover a portion of the thin-film coil 35 and connect with the magnetic pole part layer 34a. Here, together with the yoke part layer 34b, a layer 98 is formed on the fifth conductive layer 41e by the same material as that of the yoke part layer 34b. This forms a sixth conductive layer 41f constituting the conductive part 41. The magnetic pole part layer 34a and yoke part layer 34b may be formed integrally with each other.

Figure 15:
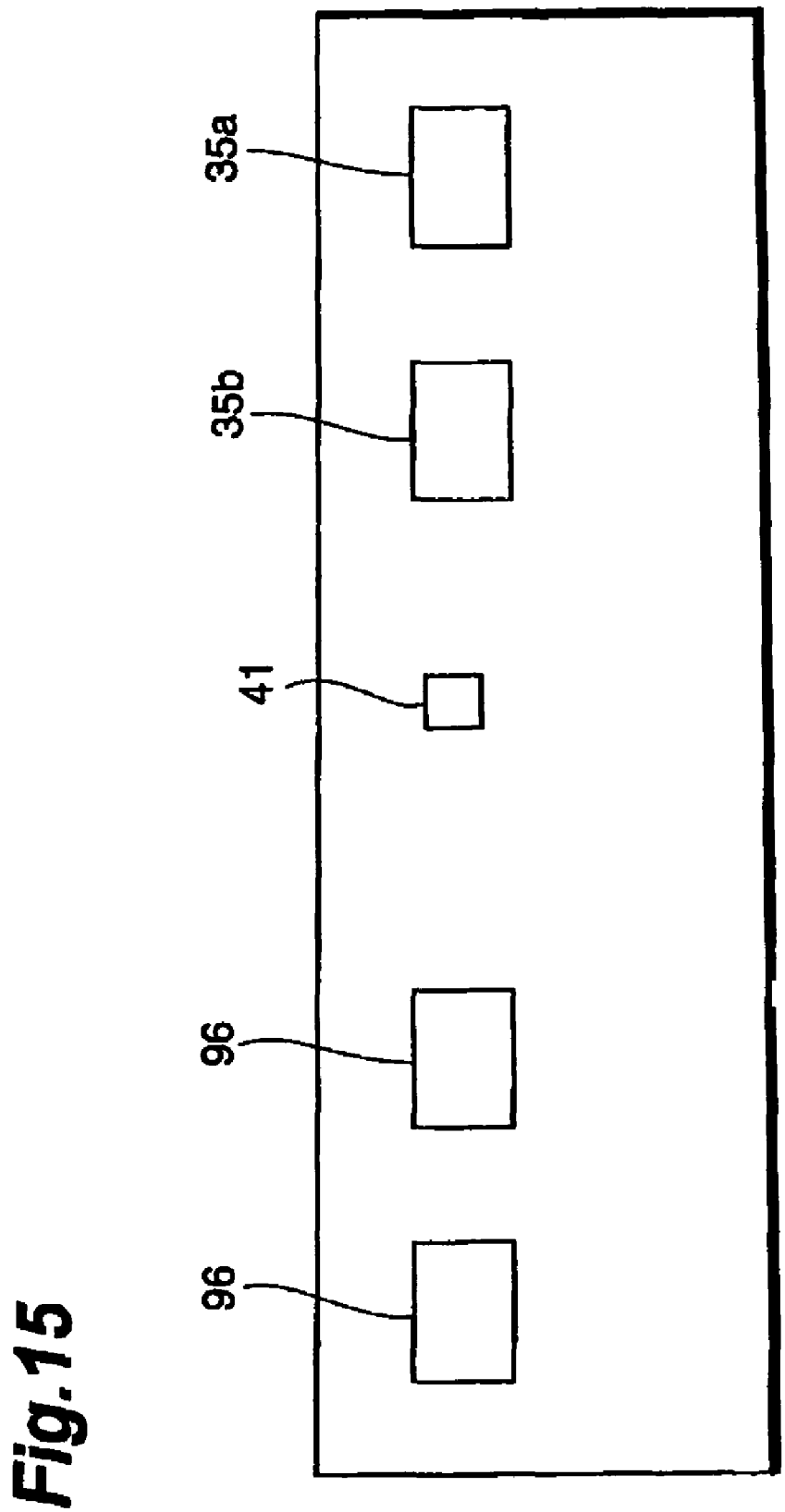
FIG. 15 is a schematic plan view of the head slider shown in FIG. 14.

Subsequently, a seventh conductive layer 41g constituting the conductive part 41 is formed on the sixth conductive layer 41f. Thereafter, an overcoat layer 25 made of an insulating material such as $Al_2O_3$ is formed by sputtering, for example, so as to cover the whole surface. Here, the conductive parts 35a, 35b of the reproducing head part 31 and a pair of conductive parts 96, 96 of the recording head part 32, which are shown in FIG. 13, are formed up to the same height as with the upper end of the conductive part 41. FIG. 15 is a schematic plan view in this state.

Figure 16:
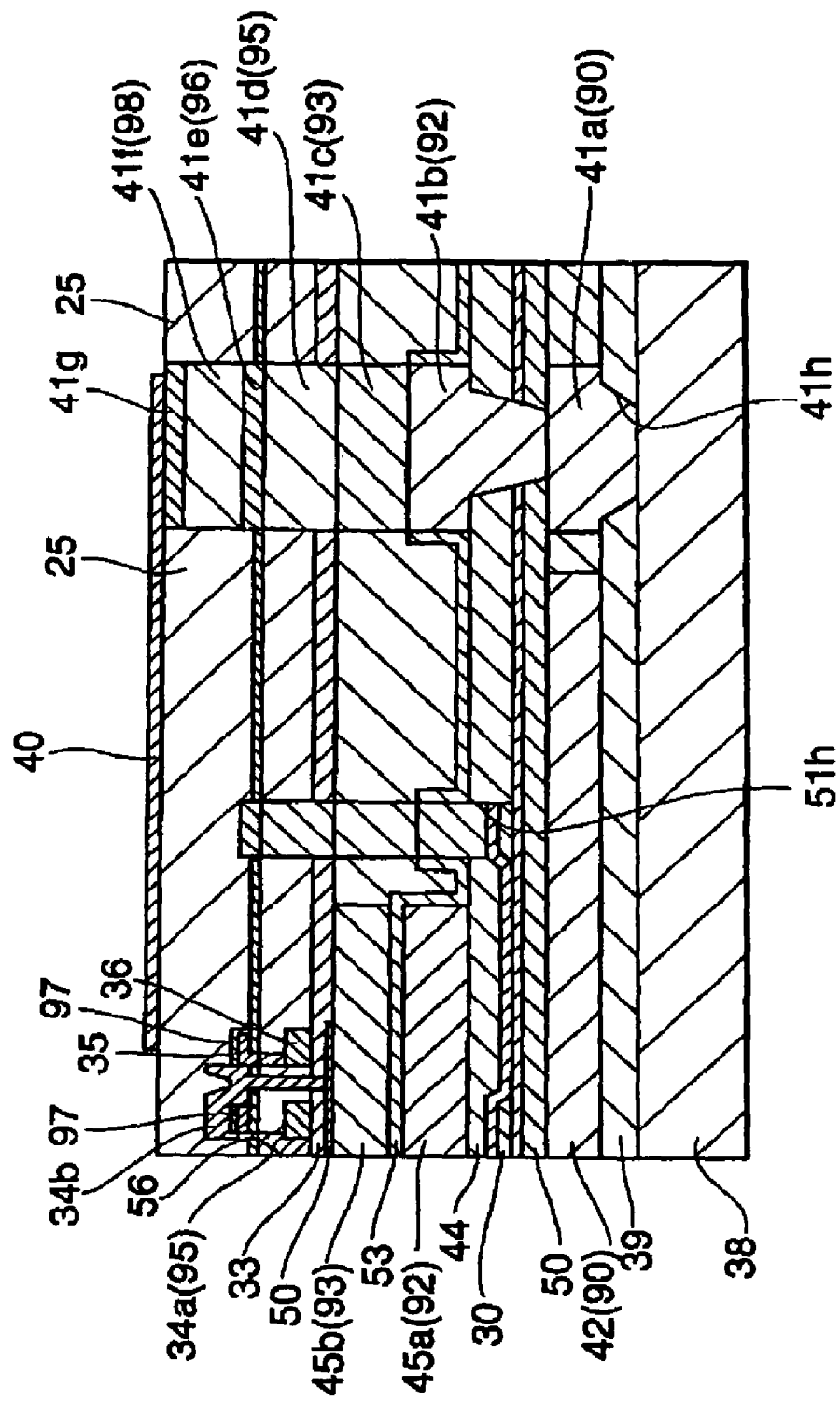
FIG. 16 is a view showing the example of method of making a head slider.
Figure 17:
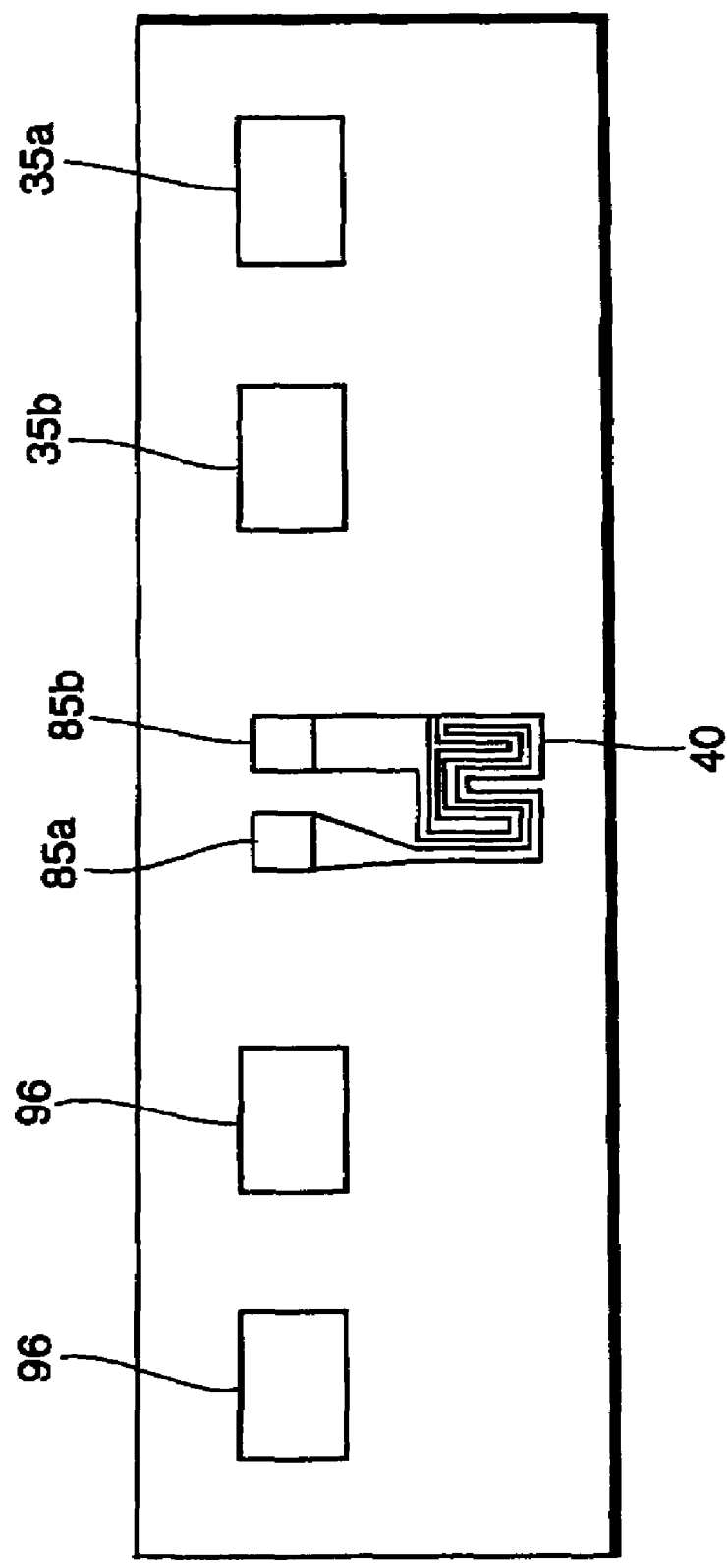
FIG. 17 is a schematic plan view of the head slider shown in FIG. 16.

With reference to FIG. 16, a subsequent step will be explained. From the state shown in FIG. 14, a heater 40 made of a conductive material such as Cu, NiFe, Ta, Ti, CoNiFe alloy, and FeAlSi alloy is formed on the overcoat layer 25 by plating, for example. FIG. 17 is a schematic plan view at this time.

In FIG. 17, both ends of the heater 40 are a first electrode (first pole) 85a and a second electrode (second pole) 85b, whereas the second electrode (second pole) 85b is connected to the seventh conductive layer 41g. The conductive parts 35a, 35b of the reproducing part 31 and a pair of conductive parts 96, 96 of the recording head part 32, which are shown in FIG. 15, are formed up to the height of the surface of the overcoat layer 25.

Figure 18:
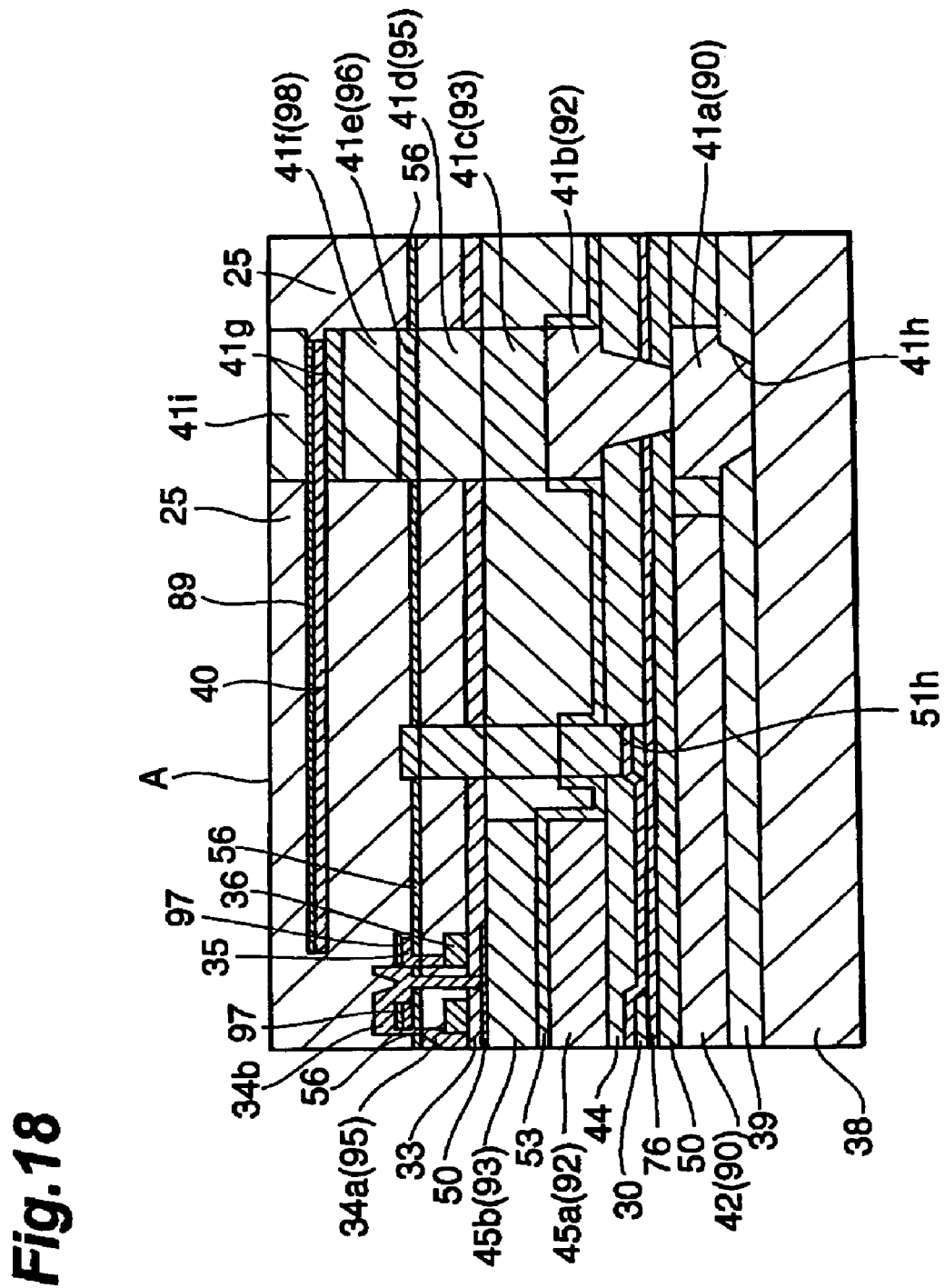
FIG. 18 is a view showing the example of method of making a head slider.
Figure 19:
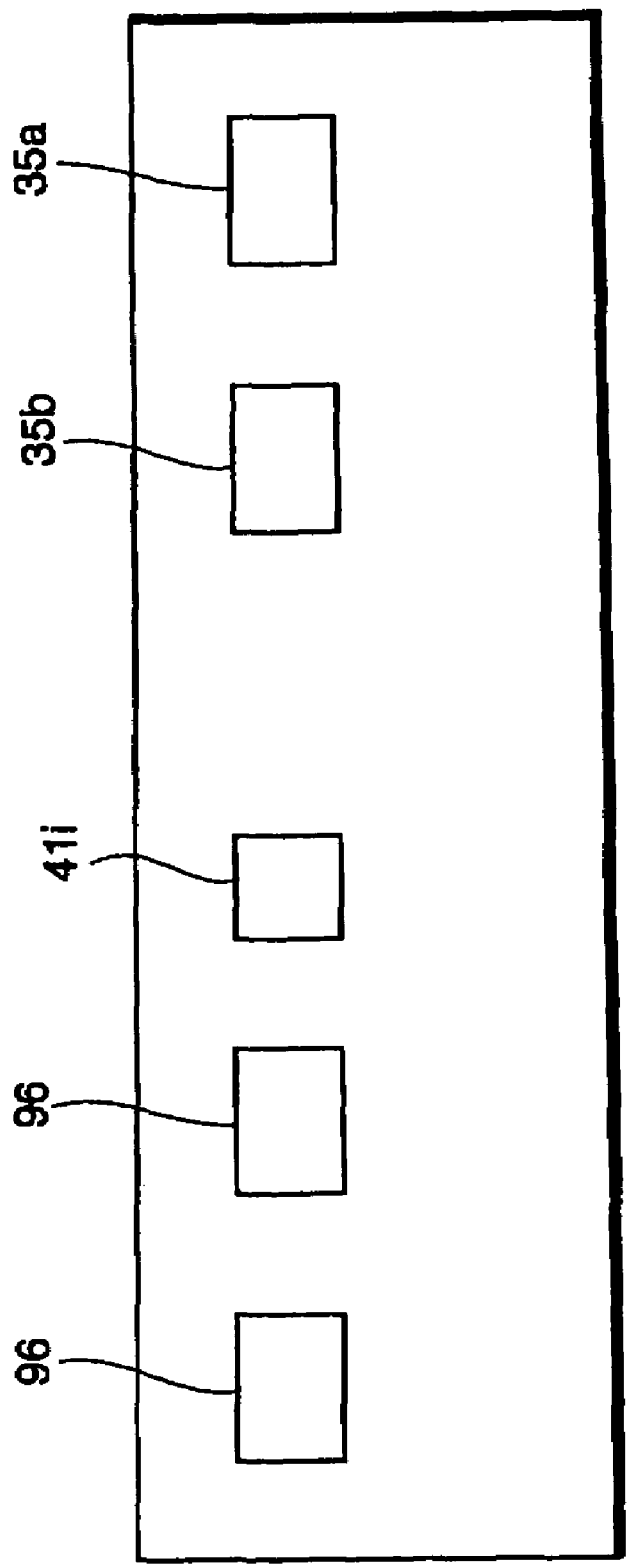
FIG. 19 is a schematic plan view of the head slider shown in FIG. 18.

With reference to FIG. 18, a subsequent step will be explained. From the state shown in FIG. 16, a heater coil cap layer 89 made of an insulating material is formed on the heater 40. Subsequently, on the first electrode 85a of the heater 40 shown in FIG. 17, an eighth conductive layer 41i constituting the conductive part 41 is formed. The eighth conductive layer 41i is formed in contact with the first electrode 85a. Then, an overcoat layer 25 is further formed so as to cover the whole surface. Subsequently, the overcoat layer 25 is polished such that the upper end of the eighth conductive layer 41i is exposed on the side of the overcoat layer 25 (its upper face in the drawing) opposite from the support 20. FIG. 19 is a schematic plan view at this time. In FIG. 19, the conductive parts 35a, 35b of the reproducing head part 31 and a pair of conductive parts 96, 96 of the recording head part 32 reach the surface of the overcoat layer 25.

Figure 20:
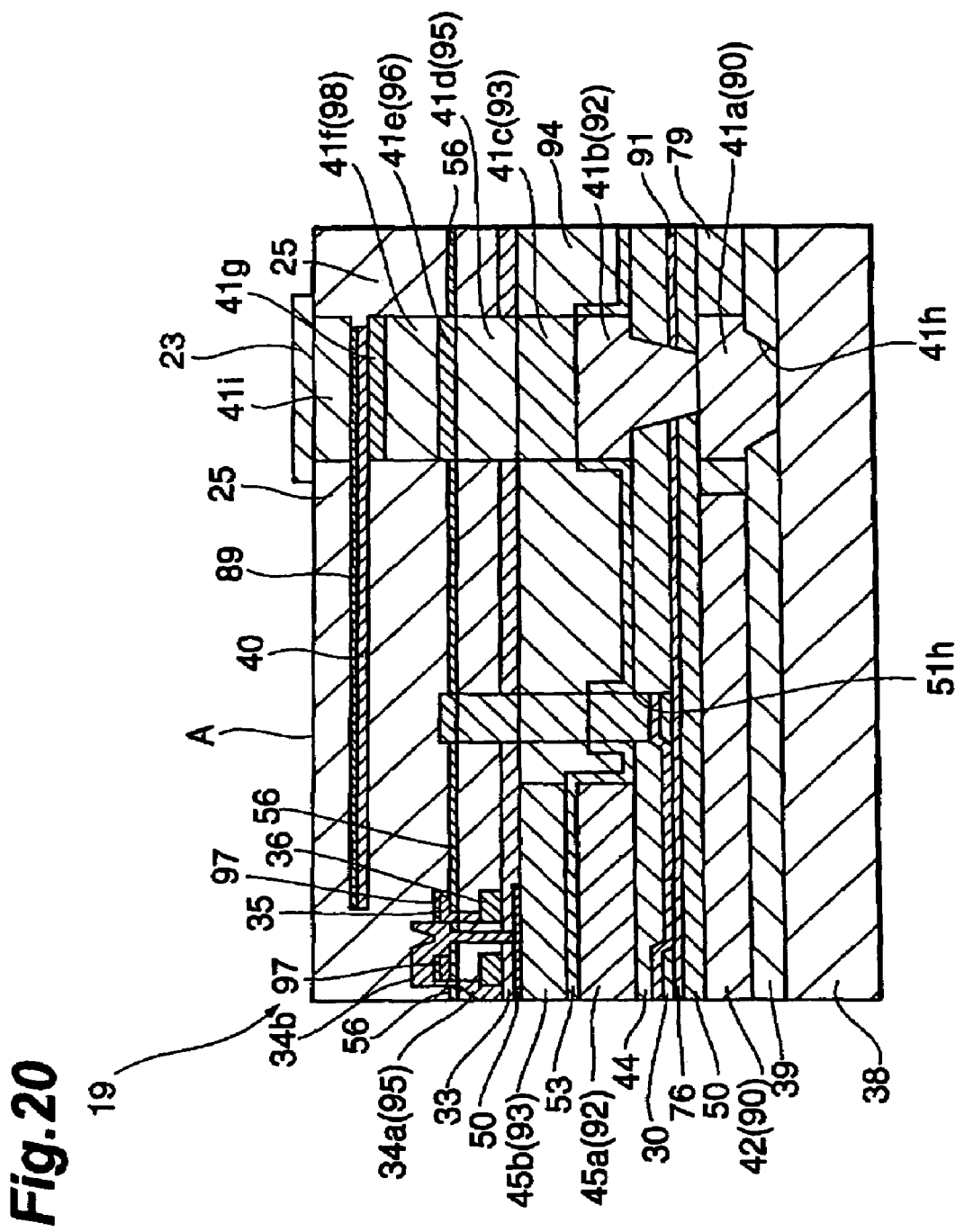
FIG. 20 is a view showing the example of method of making a head slider.
Figure 21:
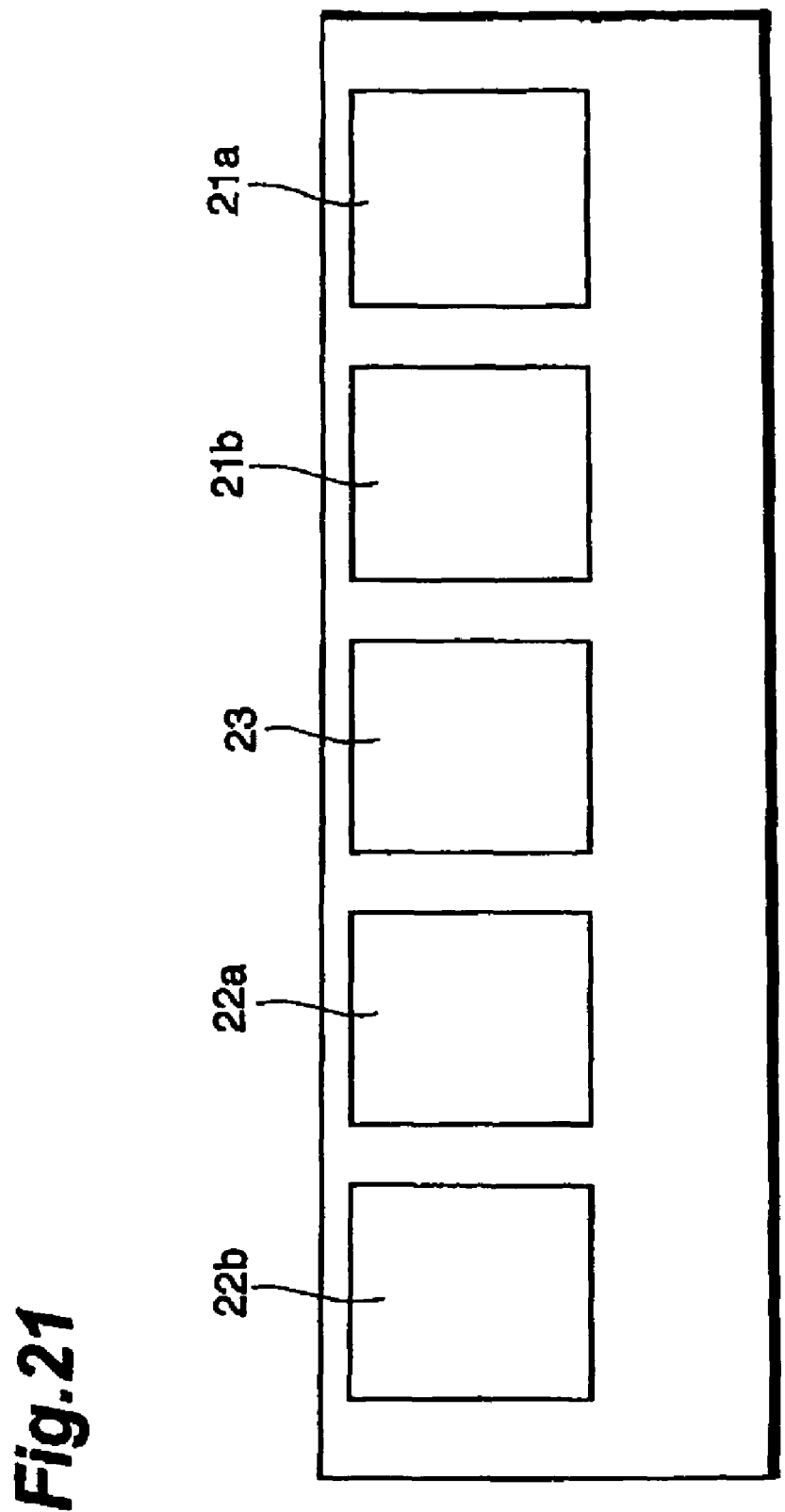
FIG. 21 is a schematic plan view of the head slider shown in FIG. 20.

Then, as shown in FIG. 20, a heater electrode pad 23 is disposed at an upper end portion of the conductive part 41 (eighth conductive layer 41i). Here, reproducing electrode pads 22a, 22b to connect with the reproducing head part 31 and recording electrode pads 21a, 21b to connect with the recording head part 32 are provided similarly. FIG. 21 is a schematic plan view at this time.

The foregoing finishes the magnetic head part 19 in accordance with this embodiment.

For example, the heater 40 may be disposed in a layer positioned between the substrate 38 and GMR device 30, or on the side of the reproducing head part 31 opposite from the air bearing surface S, i.e., on the backside of the reproducing head 31 as seen from the air bearing surface S.

Figure 22:
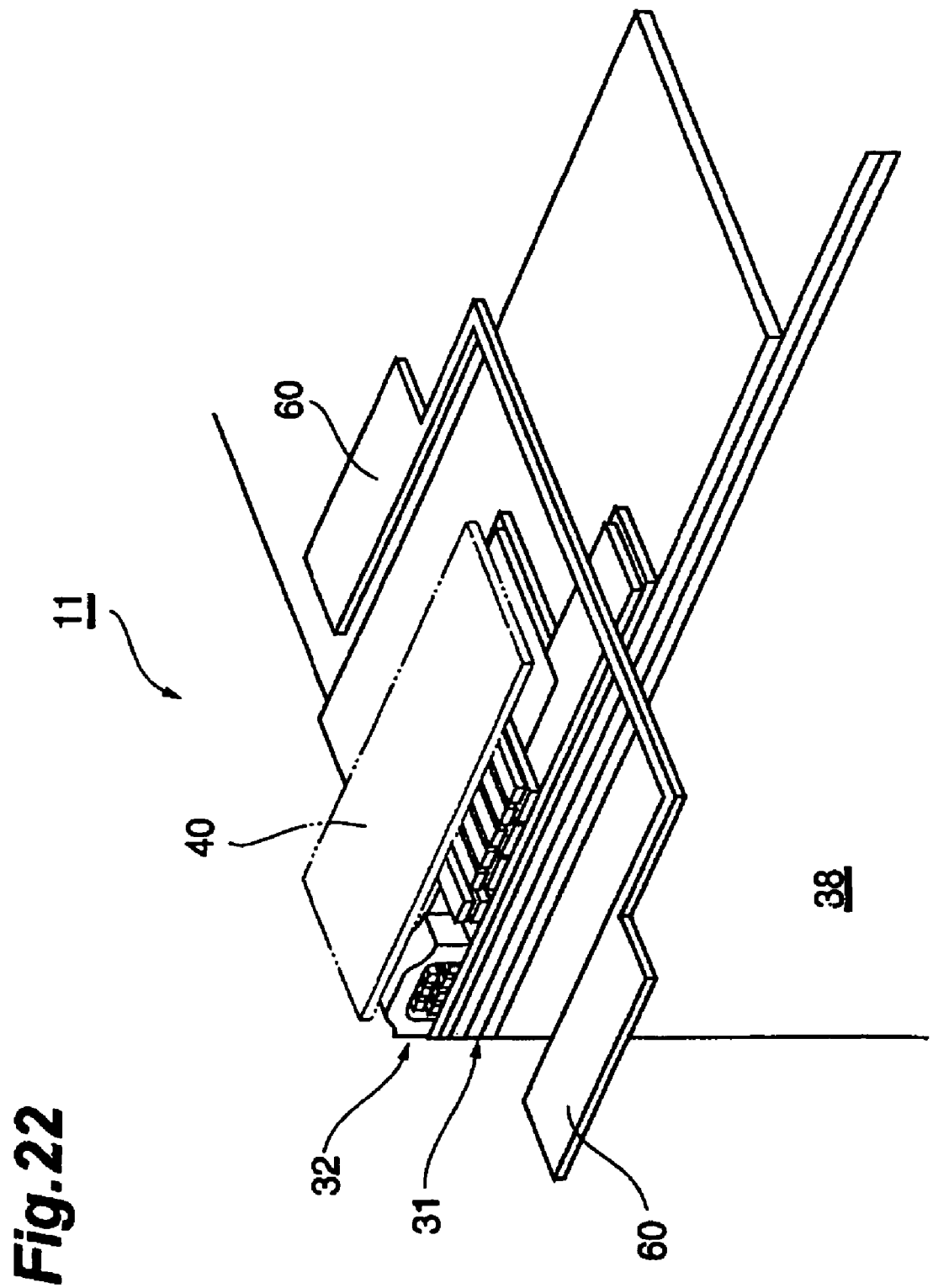
FIG. 22 is a schematic sectional view showing an example of thin-film magnetic head in which heaters are arranged in a divided fashion.

One heater may be disposed alone at the above-mentioned position, or two divided heaters may be arranged. FIG. 22 is a schematic sectional view showing an example of the magnetic head part 19 in which divided heaters are arranged. In this drawing, heaters 60 arranged in a divided fashion are disposed at the same height as with the heater 40 disposed in the overcoat layer 25 shown in FIG. 4. Though this drawing shows the arrangement in a divided fashion at the height of the heater, the height is not restricted.

When the magnetic head part 19 is finished as mentioned above, a plurality of magnetic head parts 19 are formed on a single substrate 38. For yielding the head slider 13 shown in FIG. 3, the substrate 38 is initially cut into a plurality of bars each comprising magnetic head parts 19 arranged in a row, and each bar is cut into blocks each including a magnetic head part 19. Thereafter, a desirable slider rail (not depicted) is formed and then is subjected to ion milling or the like, so as to finish the head slider 13.

Then, the head slider 13 is mounted to the suspension arm 12 such that the surface B comes into contact with the leading end side of the suspension arm 12. The wires 17a to 17c to electrically connect with the head slider 13 are laid on the suspension arm 12, and one ends of the wires 17a to 17c are bonded to the terminals 15a to 15e disposed on the leading end side of the suspension arm 12, whereas the other ends are bonded to the terminals 16a to 16e disposed on the base end side of the suspension arm 12, whereby the head gimbal assembly 10 can be made. After being made, the head gimbal assembly 10 is set up such that the head slider 13 is movable over the hard disk 2 and can record and reproduce magnetic signals, whereby the hard disk drive 1 shown in FIG. 1 is completed.

Though specifically explained with reference to embodiments in the foregoing, the present invention is not limited to the above-mentioned embodiments. For example, the device to be energized, having the first pole connected to an electrode pad disposed on the first surface and the second pole conductible by way of the second surface is the heater 40 in the above-mentioned embodiments. However, the device to be energized is not limited to the heater 40, but may be the recording head part 32 or reproducing head part 31.

In the above-mentioned embodiments, the support 20 has the second surface, whereas the second electrode of the heater 40 is conductible by way of the second surface (surface B, i.e., slider back face) of the support 20. However, a side face (support or overcoat layer) of the head slider 13 may be used as the second surface, and the second electrode may be made conductible by way of this surface. Also, an electrode pad may be provided between the second surface of the support 20 or the like and the suspension arm 12, so as to establish electrical conduction via wiring.

The second surface may be a side face of the head slider 13 which is not in contact with the suspension arm 12. In this case, the head slider 13 is bonded to the suspension arm 12 by way of an epoxy resin or the like, whereby the head slider 13 and the suspension arm 12 are insulated from each other. Then, the second surface and the suspension arm 12 are made conductible by way of a conductive resin, for example.

As explained in the foregoing, the present invention can provide a head slider, a head gimbal assembly, and a hard disk drive which have a wiring structure adaptable to smaller sizes.

The basic Japanese Application No. 2003-78585 filed on Mar. 20, 2003 is hereby incorporated by reference.

What is claimed is:

1. A head slider comprising:
a conductible support for mounting the head slider to an arm;
a magnetic head part bonded to the conductible support, the magnetic head part carrying out at least one of recording and reproducing of information; and
an energizing electrode pad disposed on a first surface of the magnetic head part on a side opposite from the conductible support,
the magnetic head part comprising:
a heater element including first and second poles for supplying a current between the first and second poles,
the first pole of the heater element being electrically connected to the energizing electrode pad, and
the second pole of the heater element being conductible by way of a second surface of the magnetic head part, the second surface not being in contact with the first surface and on the opposite side of the first surface,
the second pole being electrically connected to the arm, the second pole entering the conductible support through the second surface of the magnetic head part and exiting the conductible support through a surface in direct contact with the arm, and
the first and second poles forming a circuit with the heater element and energizing the heater element when current flows through the heater element via the first and second poles.

2. The head slider according to claim 1, the magnetic head part further comprising:
- a magnetoresistive device for reproducing, and
- an inductive electromagnetic transducer for recording,
- wherein the magnetoresistive device and the inductive electromagnetic transducer are connected to respective pairs of electrode pads additionally disposed on the first surface.

3. A head gimbal assembly comprising:
- a head slider, including a conductible support and a magnetic head part bonded to the conductible support, the magnetic head part carrying out at least one of recording and reproducing of information;
- an arm member on which the head slider is mounted via the conductible support; and
- an energizing electrode pad disposed on a first surface of the magnetic head part on a side opposite from the conductible support,
- the magnetic head part comprising:
  - a heater element including first and second poles for supplying a current between the first and second poles,
  - the first pole of the heater element being electrically connected to the energizing electrode pad, and
  - the second pole of the heater element being conductible by way of a second surface of the magnetic head part, the second surface not being in contact with the first surface and on the opposite side of the first surface,
  - the second pole being electrically connected to the arm member, the second pole entering the conductible support through the second surface of the magnetic head part and exiting the conductible support through a surface in direct contact with the arm member, and
  - the first and second poles forming a circuit with the heater element and energizing the heater element when current flows through the heater element via the first and second poles.

4. The head gimbal assembly according to claim 3, the magnetic head part further comprising:
- a magnetoresistive device for reproducing, and
- an inductive electromagnetic transducer for recording,
- wherein the magnetoresistive device and the inductive electromagnetic transducer are connected to respective pairs of electrode pads additionally disposed on the first surface.

5. A hard disk drive comprising:
- a head gimbal assembly including an arm member mounted with a head slider; and
- a recording medium,
- the head slider comprising:
  - a conductible support for mounting the head slider to the arm member,
  - a magnetic head part bonded to the conductible support, the magnetic head part carrying out at least one of recording and reproducing of information, and
  - an energizing electrode pad disposed on a first surface of the magnetic head part on a side opposite from the conductible support,
  - the magnetic head part comprising:
    - a heater element including first and second poles for supplying a current between the first and second poles, and
    - the first pole of the heater element being electrically connected to the energizing electrode pad, and
    - the second pole of the heater element being conductible by way of a second surface of the magnetic head part, the second surface not being in contact with the first surface and on the opposite side of the first surface,
    - the second pole being electrically connected to the arm member, the second pole entering the conductible support through the second surface of the magnetic head part and exiting the conductible support through a surface in direct contact with the arm member, and
  - the first and second poles forming a circuit with the heater element and energizing the heater element when current flows through the heater element via the first and second poles.

6. The hard disk drive according to claim 5, the magnetic head part further comprises:
- a magnetoresistive device for reproducing, and
- an inductive electromagnetic transducer for recording,
- wherein the magnetoresistive device and the inductive electromagnetic transducer are connected to respective pairs of electrode pads additionally disposed on the first surface.

* * * * *